US006831779B2

(12) United States Patent
Caplan

(10) Patent No.: US 6,831,779 B2
(45) Date of Patent: Dec. 14, 2004

(54) METHOD AND APPARATUS FOR STABILIZING A HIGH-GAIN, HIGH-POWER SINGLE POLARIZATION EDFA

(75) Inventor: David O. Caplan, Bedford, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/845,053

(22) Filed: Apr. 27, 2001

(65) Prior Publication Data

US 2002/0167721 A1 Nov. 14, 2002

(51) Int. Cl.[7] .............................................. H01S 3/00
(52) U.S. Cl. ...................................... 359/347; 359/333
(58) Field of Search .................................. 359/347, 333

(56) References Cited

U.S. PATENT DOCUMENTS

| 4,941,738 A |   | 7/1990  | Olsson ........................ 350/377 |
|-------------|---|---------|----------------------------------------|
| 5,038,359 A | * | 8/1991  | Pepper et al. ................. 359/300 |
| 5,263,037 A | * | 11/1993 | Trutna, Jr. et al. ........... 372/102 |
| 5,268,787 A | * | 12/1993 | McIntyre ..................... 359/347 |
| 5,295,016 A | * | 3/1994  | Van Deventer ............... 359/333 |
| 5,303,314 A |   | 4/1994  | Duling, III et al. ............. 385/11 |
| 5,311,603 A | * | 5/1994  | Fidric ............................ 372/6 |
| 5,384,966 A | * | 1/1995  | Gibbs ........................... 124/87 |
| 5,448,579 A | * | 9/1995  | Chang et al. ................... 372/18 |
| 5,574,739 A | * | 11/1996 | Carruthers et al. ............ 372/106 |
| 5,689,595 A | * | 11/1997 | Pan .............................. 359/333 |
| 5,734,667 A |   | 3/1998  | Esman et al. .................. 372/27 |
| 5,880,877 A | * | 3/1999  | Fermann et al. ............ 359/341.3 |
| 6,104,528 A | * | 8/2000  | Hwang ..................... 359/337.11 |
| 6,195,200 B1| * | 2/2001  | DeMarco et al. .............. 359/180 |

FOREIGN PATENT DOCUMENTS

GB          2326998 A  *  1/1999  ............ H04B/10/17

OTHER PUBLICATIONS

Becker et al. Erbium doped fiber amplifiers. 1999. Academic Press.*

Caplan, D.O., et al., "A high–power high–gain single–polarization EDFA", *Lasers and Electro–Optics, 2000 (CLEO 2000)*, CWJ3, pp. 283–284, May 7–12, 2000, ISBN 1–55752–634–6. (Abstract attached).

Caplan, D.O., et al., "High–Sensitivity variable–rate transmit/receive architecture", *IEEE LEOS* '99, TuU 0003, 1999.

Duling, I.N., III, et al., "Single–Polarisation Fibre Amplifier," *Elec. Let.*, 28 (12) : 1126–1128 (1992).

Glassner, David S., et al., "Spatial hole burning in erbium fiber lasers using Faraday rotator mirrors," *OFC '97 Technical Digest*, paper TuN3, pp. 66–67.

Hakimi, F., et al., "High–power single–polarization EDFA with wavelength–multiplexed pumps", *CLEO* '98, CWK1, 1998, pp. 287–288.

Tashiro, Y., et al., "High–power erbium–doped fier amplifier pumped by wavelength multiplexed semiconductor laser diode unit", *Optical Fiber Communication, OFC* '97 Conference on 1997, pp. 107–108.

* cited by examiner

Primary Examiner—Thomas G. Black
Assistant Examiner—Stephen Cunningham
(74) Attorney, Agent, or Firm—Hamilton, Brook, Smith & Reynolds, P.C.

(57) ABSTRACT

A high-gain, saturated output, double-pass, fault-tolerant optical amplifier has an extended range of stability, output power, and efficiency and fall back modes of operation. The optical amplifier is typically configured in a two-stage polarization maintaining configuration, employing erbium-doped fibers as the gain media in both of the stages. At least one optical element in a loss-insensitive region of the amplifier can have a loss substantially higher than optical elements in the gain paths outside of the loss-insensitive region without substantially reducing the overall output power and efficiency of the amplifier. These elements can influence the amplified signal waveform, spectrum, signal-to-noise ratio, or subsequent performance in an optical network, as well as amplifier characteristics, such as output power, stability, efficiency, and reliability. The optical amplifier is suitable for both free-space and fiber optic network applications.

52 Claims, 33 Drawing Sheets

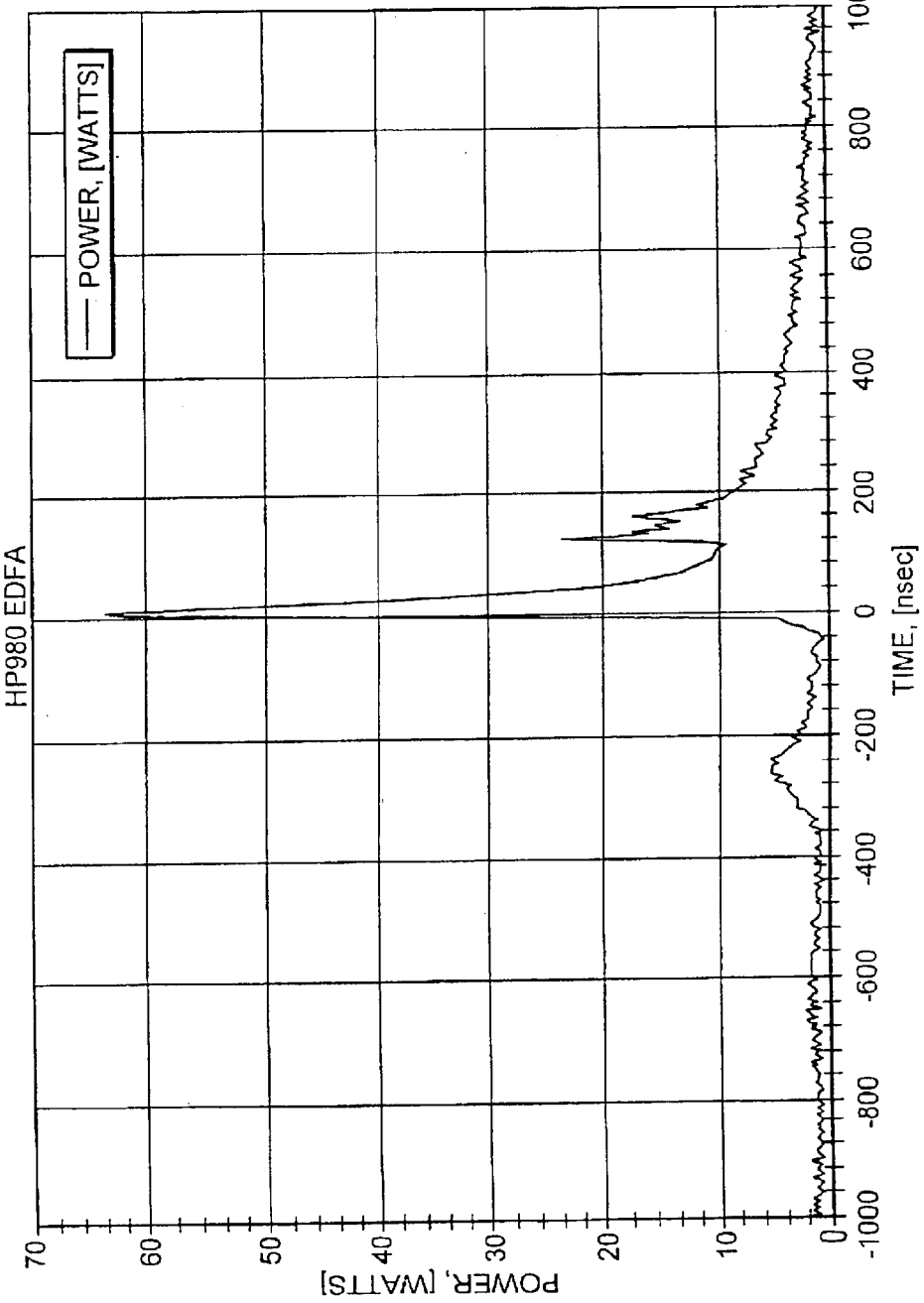

METHOD AND APPARATUS FOR STABILIZING A HIGH-GAIN, HIGH-POWER SINGLE POLARIZATION EDFA

GOVERNMENT SUPPORT

The invention was supported, in whole or in part, by a grant F19628-95-C-0002 from United States Air Force. The Government has certain rights in the invention.

BACKGROUND OF THE INVENTION

Free-space optical transmitters are typically required to provide a high-power, single-polarization output. An optical amplifier capable of providing a high-power, single-polarization output is presented in a paper, Hakimi et al., "High-power Single-polarization EDFA with Wavelength Multiplexed pumps", CLEO '98, CWK1, 1998.

High-power optical amplifiers, such as erbium-doped fiber amplifiers (EDFA's), are often employed in free-space communications. Single-polarization EDFA's provide additional capabilities for polarization diplexing and improved communication performance, since orthogonally polarized amplified spontaneous emission (ASE) can be eliminated at both receiver and transmitter. Such features can offer substantial benefit in free-space links, where an improvement in single-polarization receiver sensitivity directly reduces required transmitter power.

High gain enables a power amplifier to output its maximum saturated output power over an extended range of input power levels. In master oscillator power amplifier (MOPA) designs, this feature makes the transmitter less sensitive to insertion loss changes in the elements leading up to the power amplifier. Furthermore, saturated EDFA's are average power limited (APL), and, therefore, peak output power is inversely proportional to the duty-cycle of the input.

FIG. 1 is a schematic diagram of the erbium-doped fiber amplifier (EDFA) 100a by Hakimi et al., which is a two-stage, double-pass, polarization-maintaining EDFA with a high-power, saturated output composed of reliable, commercially available components. FIGS. 2–5 further illustrate the EDFA of FIG. 1.

Referring now to FIG. 1, a 1550 nm input optical signal 105 is coupled to a standard, single-mode, optical fiber 110 via a polarization beam splitter (PBS) 107. The input signal 105 travels in a forward pass through the optical fiber 110, among other optical media. The EDFA 100a of FIG. 1 achieves a high output power level by multiplexing four pump lasers 125 together with polarization-insensitive, dense, WDM, fused tapered couplers 120. See M. N. McLandrich et al., J. Lightwave Technol. 9, 442–447 (1991). The pump diode laser wavelengths range from 970 nm to 985 nm, with 5 nm of separation between each. According to Hakimi et al., at the recommended operating current, the nominal power of each pump before the WDM combiner is 90 mW, and the output pump power from each set of four combined pump lasers is 330 mW. The output from the dense WDM 120 is coupled to the optical medium, carrying the input signal 105, by a standard WDM 115.

In the forward pass, the output from the WDM 115 (i.e., the input signal 105 and signals from the diode pumps 125) encounters an erbium-doped fiber 130. The 970 nm–985 nm outputs from the four diode pumps 125 get absorbed by the erbium-doped fiber 130, increasing the energy level in the erbium-doped fiber 130. Unlike the 970 nm–985 nm outputs from the diode pumps 125, the 1550 nm input signal 105 passes through the erbium-doped fiber 130, increasing in power as a result of encountering the erbium-doped fiber 130 charged by the four diode pumps 125. Because the input signal 105 is amplified by the erbium-doped fiber 130, the erbium-doped fiber 130 is often referred to as an optical gain medium.

FIG. 2 is a schematic diagram representing how the erbium-doped fiber 130, in combination with the output energy from the four diode pumps 125, provides gain to amplify the input signal 105. As stated above, the pump energy 205 is absorbed by the erbium-doped fiber 130. The energy absorption representation 210 indicates that the energy in the erbium-doped fiber 130 reaches a peak level, Emax. The energy relaxes from its maximum potential energy level to a nominal potential energy level, Enom, as indicated by an energy relaxation representation 215. In this manner, pump energy is used to transfer energy from the ground state, Emin, to the excited state Enom, creating an energy inversion. Enom corresponds to the energy of the input signal wavelength. Then, when the input signal 105 encounters the excited-state erbium-doped fiber 130, stimulated emission occurs, as indicated by a stimulated emission representation 220.

As a result of the release of optical energy resulting from the stimulated emission process, a signal photon 225 of 1.5 $\mu$m wavelength entering the energy-enhanced erbium-doped fiber 130 exits as multiple photons 230 of the same wavelength, thus amplifying the signal.

Referring again to FIG. 1, a second WDM 115 and erbium-doped fiber 130 are encountered by the input signal having been once amplified. Following the second erbium-doped fiber 130, the twice amplified input signal encounters a Faraday mirror 135, causing the twice amplified input signal to travel in a reverse pass with a 90 degree polarization rotation. The signal traveling in the reverse pass is amplified a third and a fourth time, as it traverses through the optical gain mediums 115 to the polarization beam splitter 107. The output 140a is the saturated output from the EDFA 100a.

The input port of the EDFA 100a, consisting of the fiber-pigtailed polarization beam splitter 110, has a 0.4-dB port-to-port loss. The Er-fiber (i.e., erbium-doped fiber) splice losses, Faraday mirror loss, and 980/1550 WDM losses are 0.1 dB, 0.33 dB, and 0.1 dB, respectively. Each amplifier stage uses approximately 15 meters of conventional erbium-doped fiber.

FIG. 3 shows the output power verses the input signal power for the EDFA 100a measured after the polarization beam splitter 107. The curve defined by the triangles is a result of the energy pumps providing 330 mW/stage (triangles). In this case, the output power of the EDFA 100a is just over 255 mW at 1556 nm, which is near the peak of the gain. When the pump lasers are turned up above the recommended operating point to 400 mW/stage (diamonds), the saturated output power is 315 mW.

FIG. 4 illustrates the wavelength dependence of the output of the EDFA 100a. A 1 mW input signal and 330 mW/stage pump power are held constant in generating the response curve. The output power is above 240 mW over a 30 nm range.

FIG. 5A is a transfer function 500 of a typical amplifier, of which the EDFA 100a is a member. The transfer function has two regions: a small signal gain region 505 and a saturated output gain region 510. The gain curve 515 in the small signal gain region 505 increases at a typical rate, where Pout equals $g_o$*Pin, and $g_o$ is the small signal gain. Note that, in dB, the linear expression Pout=$g_o$*Pin transforms to Pout [dB]=($g_o$+Pin) [dB]. In the saturated output gain region 510, the curve 515 asymptotically increases to Psat_out. The EDFA 100a of FIG. 1 operates entirely in the saturated output gain region 510 for input power levels about −15 dBm. However, for input power levels of below −15 dBm, the EDFA 100a becomes unstable, oscillating instead of outputting a constant power level for an input signal of constant power level. The EDFA 100a does not simply revert to a small signal gain amplifier, as might be suggested by the transfer function, because the EDFA 100a is designed only to operate stably for input power levels that drive the amplifier far into the saturated output gain region.

FIG. 5B is a transfer function of gain versus output power corresponding to the transfer function of FIG. 5A.

SUMMARY OF THE INVENTION

A fault-tolerant, loss-insensitive region in a two-stage, double-pass, polarization maintaining (PM) EDFA has been identified, in which assertion of optical elements can be used for, among other reasons, to improve stability, output power, and efficiency of the EDFA. Employing the principles of the present invention, stable, greater than 0.5 Watt output power levels are obtainable for input power levels to the EDFA spanning over a 30 dB dynamic range, and 980/1550 nm conversion efficiencies that can exceed 42%.

In one embodiment of the present invention, an optical amplifier includes an amplifying optical path of elements of low insertion losses, including a non-lasing optical gain medium through which an optical signal is amplified. The optical amplifier further includes an optical return path by which amplified light from a first pass returns through the gain medium in a reverse pass through the gain medium. At least one optical element optically disposed in the optical return path, between the forward pass and the reverse pass, has a loss substantially greater than the insertion losses of the non-gain elements within the amplifying optical path. The amplifying optical path is sometimes referred to as the loss-sensitive region, and the region beyond the amplifying optical path (i.e., between the forward pass and reverse pass) is sometimes referred to as the loss-insensitive region (see FIG. 6, 600). Non-gain optical elements may include, for example, optical coupling elements (e.g., polarization beam splitters, circulators, or wavelength multiplexers) and splices.

The elements in the amplifying optical path are typically selected to have insertion losses less than about 0.5 dB, preferably less than about 0.2 dB. The optical element(s) between the forward pass and the reverse pass can have insertion loss(es) of greater than 0.5 dB without significant effect on the output power of the optical amplifier.

The optical return element, used to direct the input signal into the optical amplifier and direct the amplified signal out of the optical amplifier, is typically a beam splitter, polarizing beam splitter, or circulator.

In the preferred embodiment, each gain medium includes at least one erbium-doped fiber. To increase the available energy in the gain medium, the amplifier includes at least one energy pump coupled to the gain medium. For an erbium-doped fiber, the energy pump is typically chosen to output a 980 nm wavelength signal. For the 980 nm pumps wavelengths composed of about 500 mW of wavelength multiplex pump power, pumping a Lucent® HP980 erbium fiber, the erbium-doped fiber is preferably between about 15 and 17 meters in length. The length of the fiber is dependent on type of fiber and pump power levels.

The optical element(s) in the loss-insensitive region include(s) at least one of the following elements: a band pass filter, band reject filter, notch filter, comb filter, beam shaper, at least one wavelength division multiplexer coupling at least one 1480 nm wavelength output signal to a respective gain medium or at least one 980 nm WDM or pump element coupling that can be used for reverse pumping or redirecting excess forward pump energy, such as a cladding pump. Further, the optical return element is selected from a group consisting essentially of: a mirror, Faraday mirror, polarization rotation reflection element, beam splitter and plural mirrors, or continuous optical medium loop. In contrast to a laser, in the EDFA, the round-trip gain of the optical signal is less than the round-trip loss of the optical signal. In other words, the EDFA amplifies the input signal, and it is desirable to minimize frequencies at which lasing might occur.

In one implementation, the amplifying optical path of elements includes an input element, first WDM and second WDM in the loss-sensitive region, third WDM in the loss-insensitive region, at least one optical filter also in the loss-insensitive region, and optical return element. In this implementation, the input element is a polarizing beam splitter that directs the input signal into the optical medium of the amplifier and out of the optical medium of the amplifier after a double-pass through two optical gain mediums. The first WDM inserts into the first non-lasing optical gain medium a 980 nm signal from at least one energy pump. The second WDM inserts a 980 nm signal from at least one energy pump into the second non-lasing optical gain medium. The third WDM inserts into the first and second optical gain media a 1480 nm signal from at least one energy pump. The optical filter in the loss-insensitive region (i) has an insertion loss that can be substantially greater than the insertion losses of optical elements external from the loss-insensitive region and (ii) passes essentially the optical signal. In this implementation, the optical return element is preferably a Faraday mirror. The optical signal that has been amplified by the optical amplifier of this embodiment is substantially singularly polarized through use of the polarizing beam splitter and Faraday mirror. This implementation allows for multiple spare energy pumps in both the loss-sensitive and loss-insensitive regions and at both 980 nm and 1480 nm wavelengths.

In one embodiment, at least one of the optical elements in the optical return path between the forward pass and the reverse pass restricts the optical signal to wavelengths of interest to prevent other wavelengths from lasing, thereby increasing stability. The optical amplifier is suitable for use in free-space and fiber optic network applications.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 10B is a plot showing high peak power, self pulsing that can occur in high-gain, high-power, optical amplifiers.

DETAILED DESCRIPTION OF THE INVENTION

A description of preferred embodiments of the invention follows.

Figure 6:
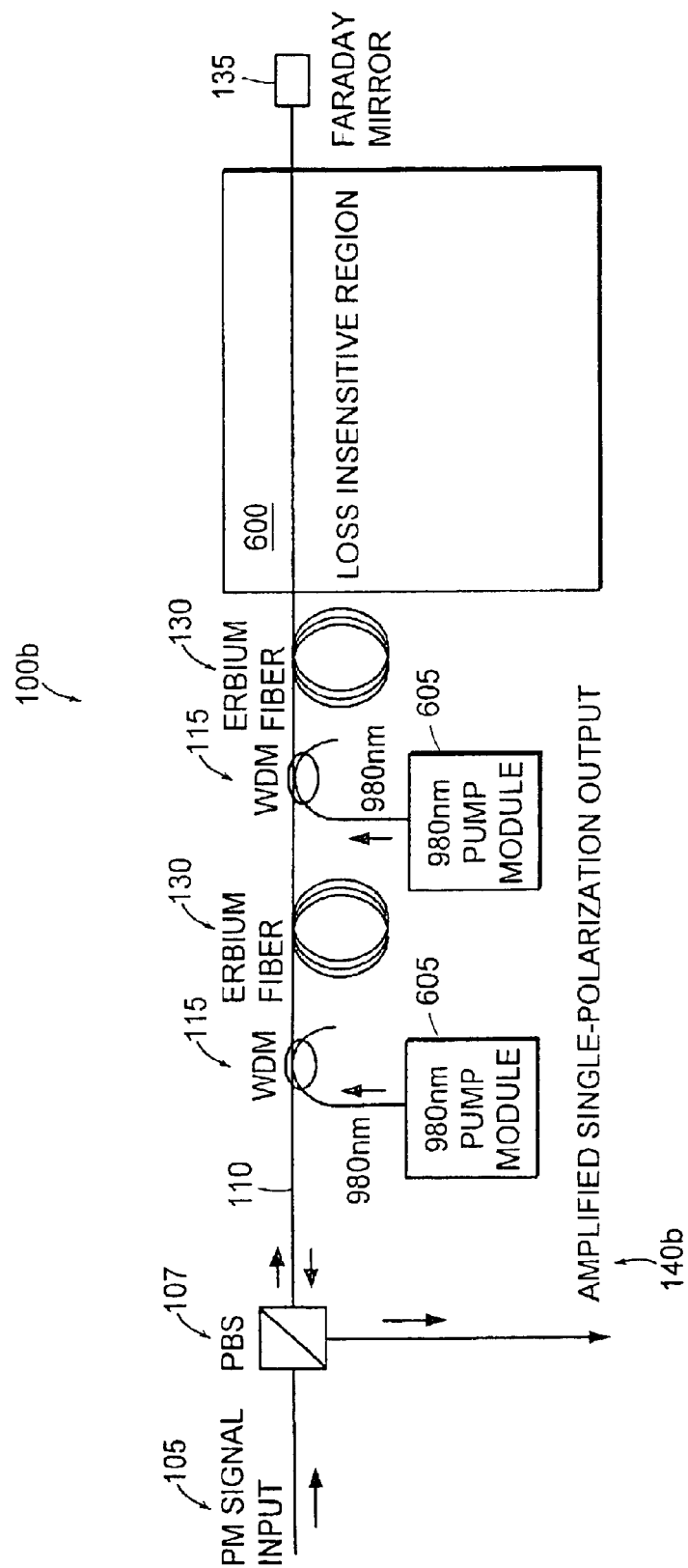
FIG. 6 is a schematic diagram of an optical amplifier having a loss-insensitive region according to the principles of the present invention.

According to the principles of the present invention and identified by the inventor, the double-pass EDFA design has an added benefit beyond single-pass EDFA designs in that it has a loss-insensitive region, as depicted in FIG. 6. By taking advantage of the loss-insensitive region, the double-pass design can be improved to exhibit increased stability, output power, and efficiency characteristics. Furthermore, while excess loss near the amplifier output directly reduces the output power by 1 dB per dB loss, additional attenuation in the loss-insensitive region of the double-pass amplifier has little affect on the net output power, as long as the amplifier continues to operate in saturation. The impact of attenuation in the loss-insensitive region has been measured to be less than 0.2 dB change in output power per dB of attenuation.

Consequently, advantageous elements, such as a narrow-band filter, WDM pump multiplexer(s), or other optical elements, either alone or in combination, can be inserted into the design in the loss-insensitive region with negligible power penalty at the output of the optical amplifier. For example, the narrow-band filter removes out-of-band ASE that competes with the signal for gain, enabling the amplifier to saturate at lower input power levels, as will be discussed in reference to FIGS. 10–12. The narrow-band filter also makes the amplifier more stable by increasing the threshold of lasing at the ASE peak, thus reducing the risk of potentially damaging 100W class Q-switched pulses. These features make the double-pass design more robust and fault-tolerant than the single-pass equivalents.

As another example of the uses for the loss-insensitive region, a 1480/1550 nm WDM can be asserted in the loss-insensitive region to enable dual-wavelength pumping strategies with little penalty. Since the optimum erbium lengths for 1480 nm pumping are roughly twice those for 980 nm, which is a wavelength typically employed by the dual-stage energy pumps in EDFA's, this design can be driven at 980 nm, 1480 nm, or both pump wavelengths with high efficiency. A dual-wavelength design provides additional redundancy and fall-back modes of operation that are important for high-reliability in terrestrial, submarine, and free-space systems. It is particularly attractive to include 1480 nm pumping for EDFA's used in space laser communications due to radiation-induced losses in erbium-doped fiber, which are substantially higher at shorter wavelengths.

Figure 1:
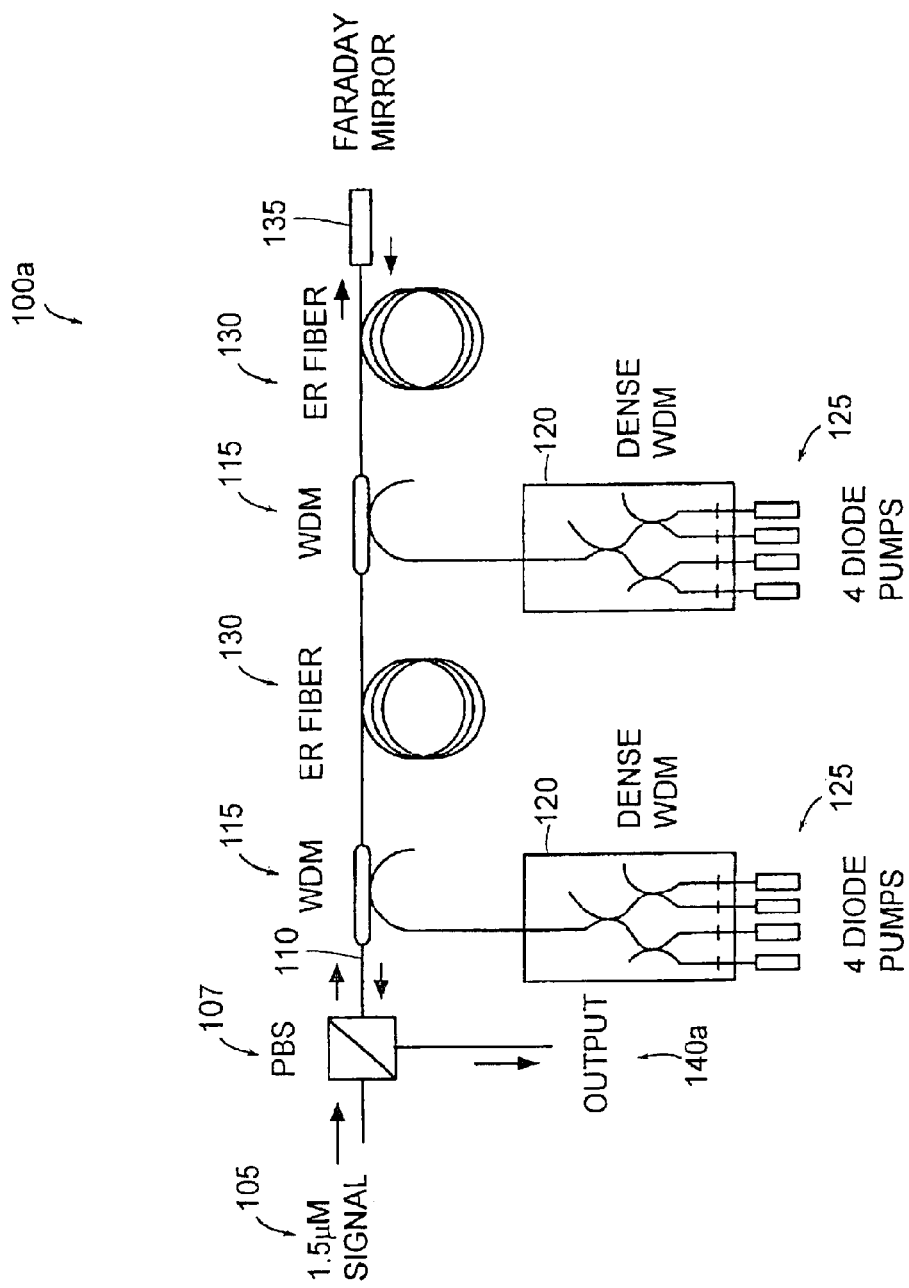
FIG. 1 is a schematic diagram of a prior art two-stage, erbium-doped fiber amplifier (EDFA) with a linear, polarization-maintaining output.
Figure 2:
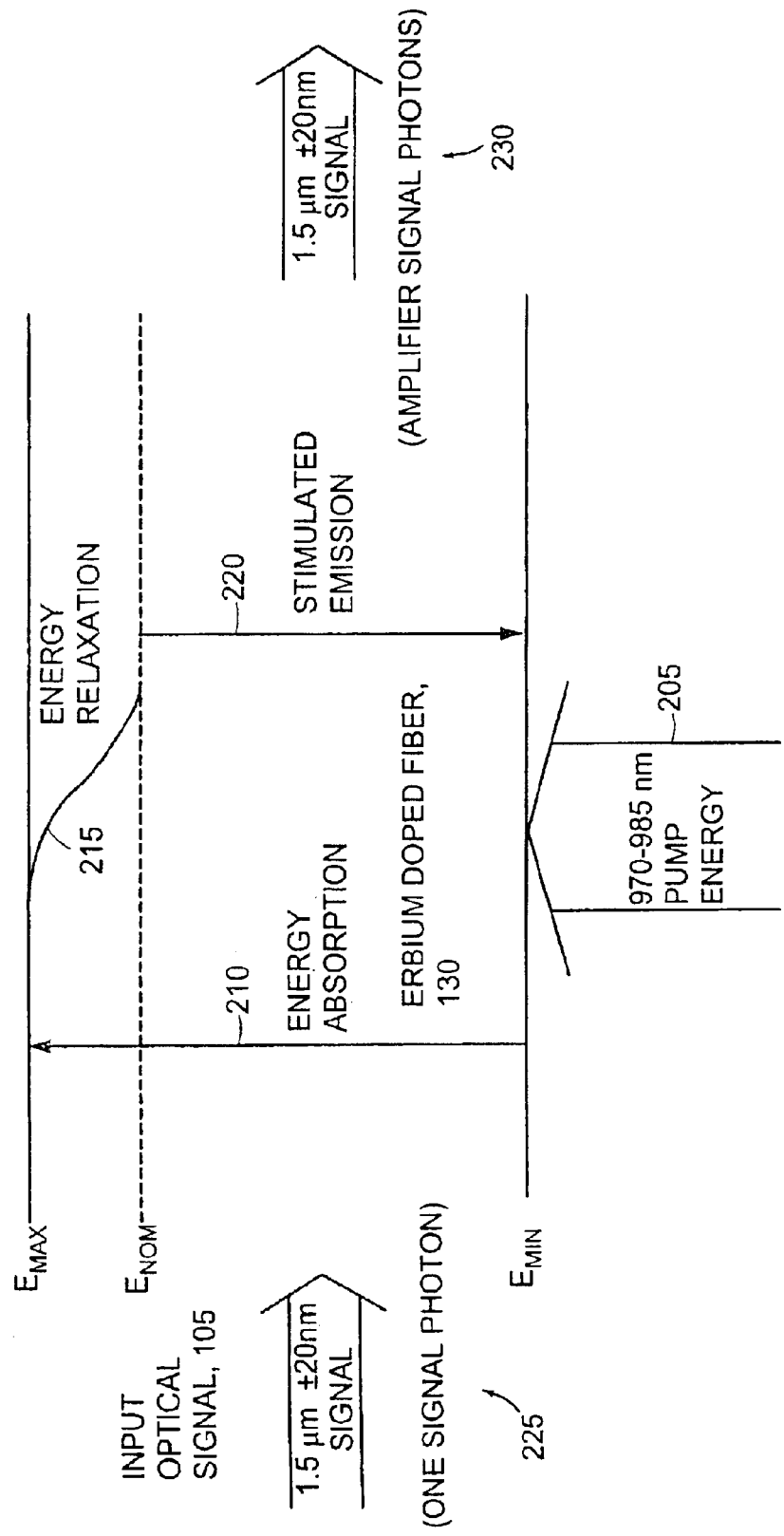
FIG. 2 is a schematic diagram depicting energy absorption in an erbium-doped fiber employed in the prior art amplifier of FIG. 1.
Figure 3:
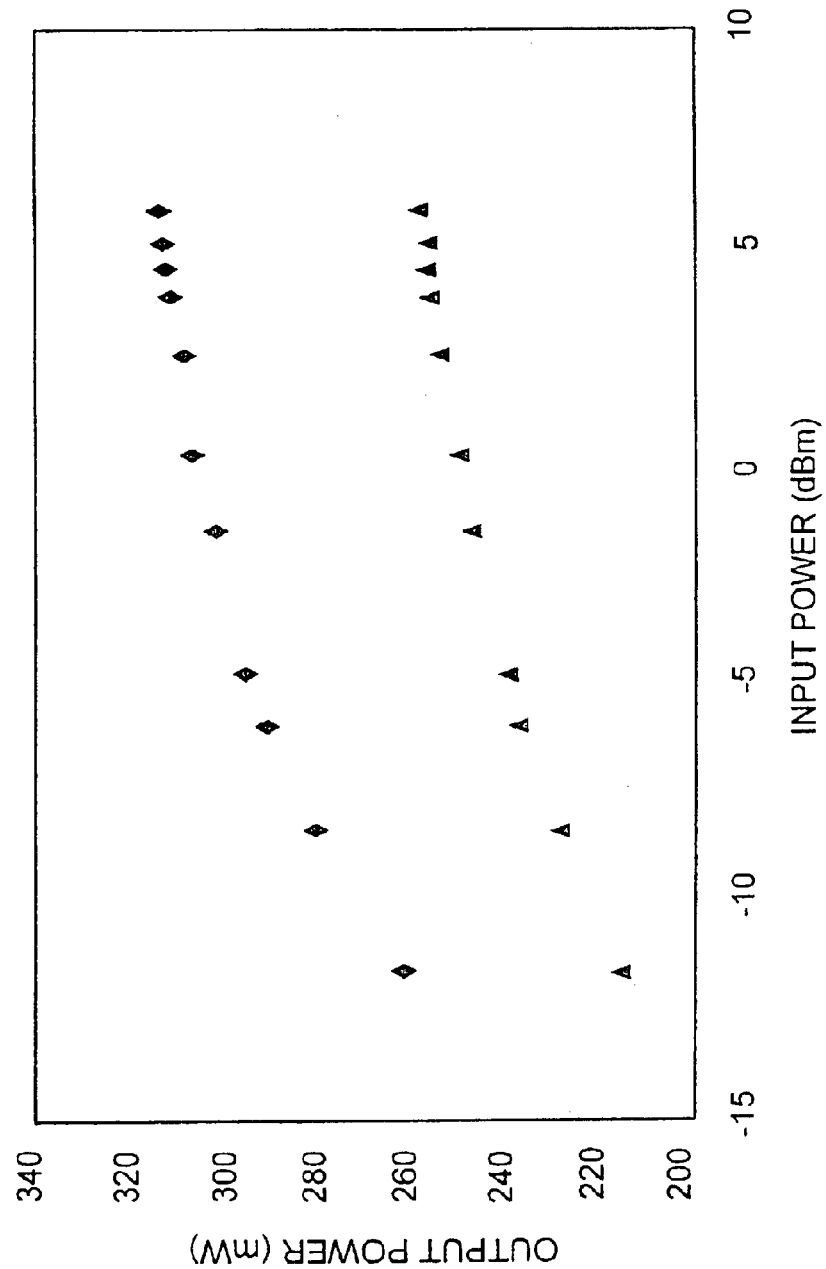
FIG. 3 is a measured plot of the output power versus input power for the prior art amplifier of FIG. 1.
Figure 4:
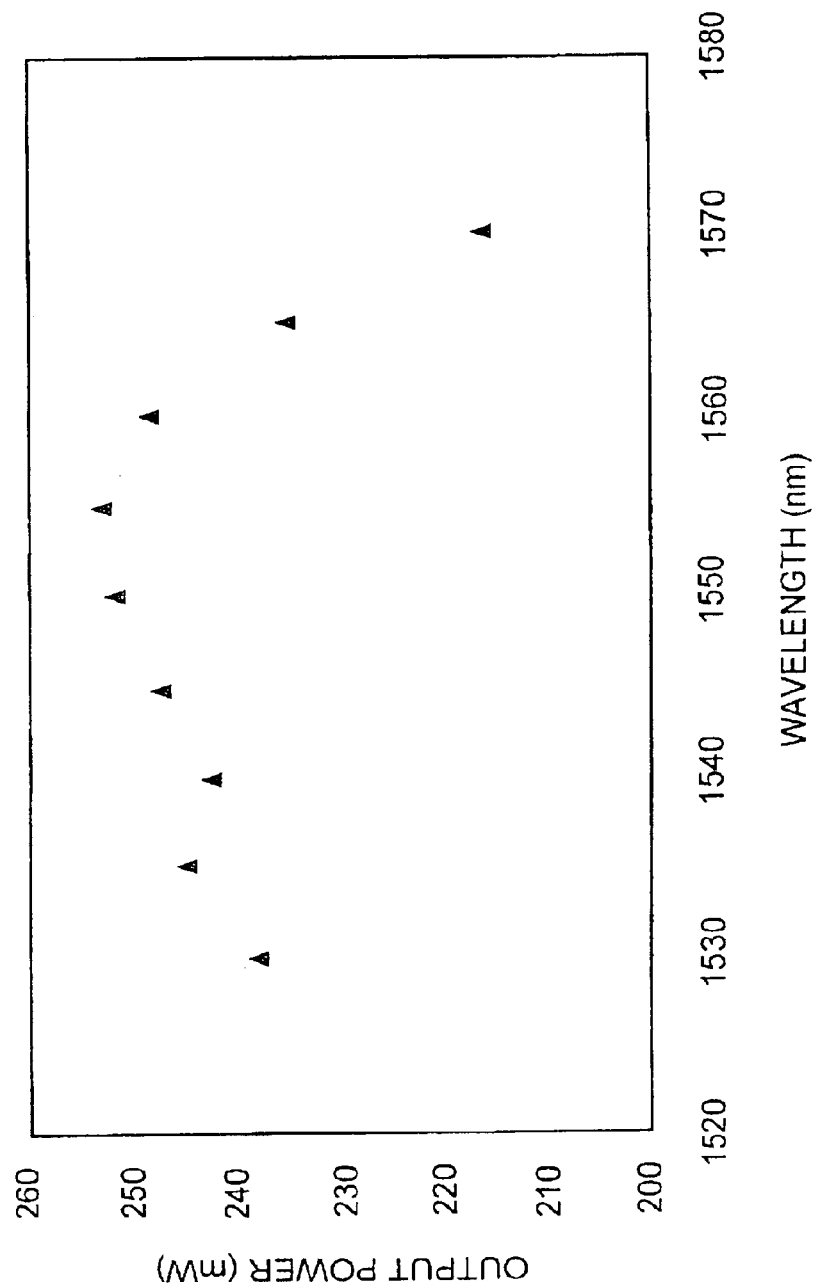
FIG. 4 is a plot of the output power versus wavelength for the prior art amplifier of FIG. 1.

Thus, according to the principles of the present invention, a stable, high-gain, high-power, single-polarization EDFA, as herein described, provides a flexible and fault-tolerant, single-polarization, EDFA design made from commercially-available components that can be pumped using both 980 nm and 1480 nm wavelengths. Further, the commercially-available components employed in the loss-insensitive region can have higher insertion losses than those elements outside of the loss-insensitive region, and, therefore, can be less expensive optical elements. By taking advantage of the loss-insensitive region in the double-pass design, an EDFA employing the principles of the present invention has an improved performance and stability over prior art EDFA's, such as depicted in FIG. 1, while maintaining high efficiency and output power. FIGS. 6–19 and the descriptions associated therewith provide further details and alternative embodiments.

FIG. 6 is an embodiment of a two-stage double-pass EDFA 100b with a Faraday mirror 135 depicting the loss-insensitive region 600 inside the border of a rectangular box. The loss-insensitive region 600 is optically located between an optical gain medium, in this case the erbium fiber 130, and the optical return element, in this case the Faraday mirror 135.

The two-stage double-pass EDFA with Faraday mirror maintains single-polarization while using standard, single-mode, commercial-off-the-shelf (COTS) components. The double-pass design combines the gain of a four-stage amplifier with the efficiency of a one-stage single-pass design, as previously discussed. The loss-insensitive region (i) allows for adding optical elements to increase stability and power without sacrificing efficiency, (ii) provides flexibility in design and (iii) relaxes optical components or elements tolerances.

Notably, the optical elements asserted in the loss-insensitive region 600 can have relatively high insertion losses with respect to the optical elements external from the loss-insensitive region 600. In particular, the optical elements external from the loss-insensitive region 600 typically have insertion losses of less than or equal to 0.2 dB, and the optical elements inside the loss-insensitive region 600 can be selected from lower-grade optical components having insertion losses of greater than 0.5 B.

In operation, the EDFA 100b behaves identically to the EDFA 100a depicted in FIG. 1, save for the optical effects asserted by optical elements inserted into the loss-insensitive region 600. Briefly, a polarization-maintaining optical input signal 105 is directed into a standard single-mode fiber 110 by a polarizing beam splitter 105. A wave division multiplexer (WDM) 115 multiplexes the input signal 105 and a 980 nm pump module 605 output into an erbium fiber 130. It should be understood that the 980 nm pump module may also include wavelength multiplexed pumps having four diode pumps, as in FIG. 1 for example. A second WDM 115 couples an output from a second 980 nm pump module 605 to a second erbium fiber 130. Thus, the input signal 105 encounters two gain stages in a first or forward pass to the Faraday mirror 135. The return signal from the Faraday mirror 135, which is phase rotated 90° by two 45° phase shifts caused by the Faraday mirror 135, makes a second or reverse pass through the two gain stages.

Following the fourth gain stage experienced by the optical signal then traveling in the reverse pass, the four-time amplified signal is directed out of the optical amplifier, indicated as an amplified single-polarization output 140b. It is well understood that optical amplifiers adds noise in both polarization states. Therefore, if only one polarization state is output, then only one-half of the noise is contained in the amplified single-polarization output 140b. Such an output is useful in fiber optic networks, since optical signals may be amplified at several points along an optical path between, say, central offices (not shown) in a telephony or ISDN network (further discussed in reference to FIG. 18). Multiple amplifications of noise severely retards the signal-to-noise ratio of an optical signal, causing signal degradation and an increase in error rate. Therefore, a single-polarization amplifier, such as the EDFA 100b, can assist in maintaining high signal-to-noise ratio signals.

Figure 7A:
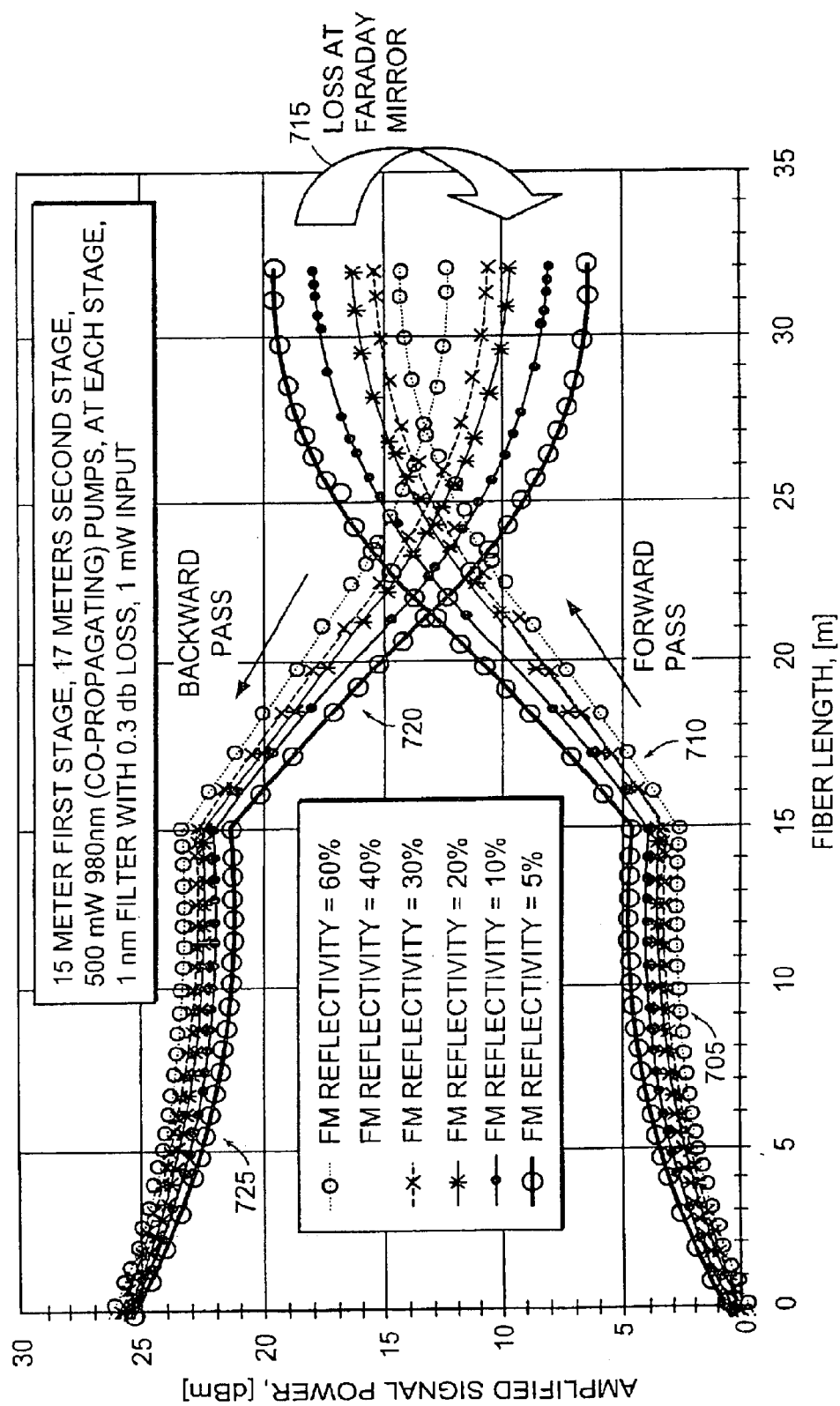
FIG. 7A is a plot of amplified signal power versus fiber length related to the erbium-doped fiber employed in the optical amplifier of FIG. 6.

FIG. 7A is a plot indicating amplified signal power in dBm versus fiber length in meters for different reflectivities of the Faraday mirror. The effects on the optical signal caused by the forward pass and reverse pass are indicated, where the forward pass begins at the lower left of the plot, at (0,0), and the backward pass begins at the right side of the plot and ends at the y-axis.

Through the first erbium-doped fiber 130 in the forward pass, the optical input signal 105 increases in power from 0 dBm to between 3–5 dBm, as indicated by power curves 705. Curves 710 show an increase through the second erbium-doped fiber 130 in the forward pass, increasing the power of the once-amplified optical signal from between 3–5 dBm to between 14–20 dBm. The loss at the Faraday mirror 135 causes the twice-amplified optical signal a reduction in power from between 14–20 dBm to between about 6–13 dBm, as indicated by arrow 715.

In the backward pass, the second erbium-doped fiber 130 in the forward pass—and first in the reverse pass—having an increase in energy from the 980 nm pump module 605, causes the twice-amplified optical signal to further increase in power from about 6–13 dBm to between about 21–24 dBm, as indicated by curves 720. Finally, the first erbium-doped fiber 130 (i.e., the second erbium-doped fiber in the backward pass through the EDFA) causes the thrice-amplified optical signal to again increase in power, this time from between about 21–24 dBm to about 25–26 dBm, as indicated by curves 725. At some point in the reverse pass, the power of the optical signal crosses the saturation threshold, Psat (FIG. 5A), of the EDFA 100b.

Continuing to refer to FIG. 7A, the first erbium fiber 130 in the embodiment of FIG. 6 in the forward pass is 15 meters in length, and the second erbium fiber 130 in the forward pass is 17 meters in length. At each stage, there are 500 mW, 980 nm pumps, where the pumps are co-propagating. The polarization-maintaining signal input 105 is 1 mW. A 1 nm filter having a 0.3 dB loss is used to filter the 1 mW input. The loss of the Faraday mirror 135 is varied, where the reflectivity is greatly changed to dramatically show how loss insensitive the loss-insensitive region 600 is, while still providing a stable output. Notably, the difference of the amplified single-polarization output 140b (FIG. 6) is less than 1 dB for reflectivity changes exceeding 13 dB.

In the double-pass EDFA design, in which amplified light is reflected back through the amplifying elements, the EDFA re-uses the same gain medium, making a two stage amplifier comparable to a four-stage, single-pass design, but with fewer components in the critical path. With the double-pass design, the forward gain is equal to the backward gain, and pump power that is not converted during the forward pass can be extracted during the backward pass. When operating in saturation, the average gain adjusts over the length of the double-pass EDFA until the amplified signal extracts all the available, converted, pump power. As a result, the double-pass design is insensitive to the distribution of pump power, in contrast to single-pass designs, which are more sensitive to the pump power of the final stage.

Energy in the erbium-doped fiber 130 not released by the optical signal traveling in the forward pass tends to be released in response to the optical signal traveling in the reverse pass.

Figure 7B:
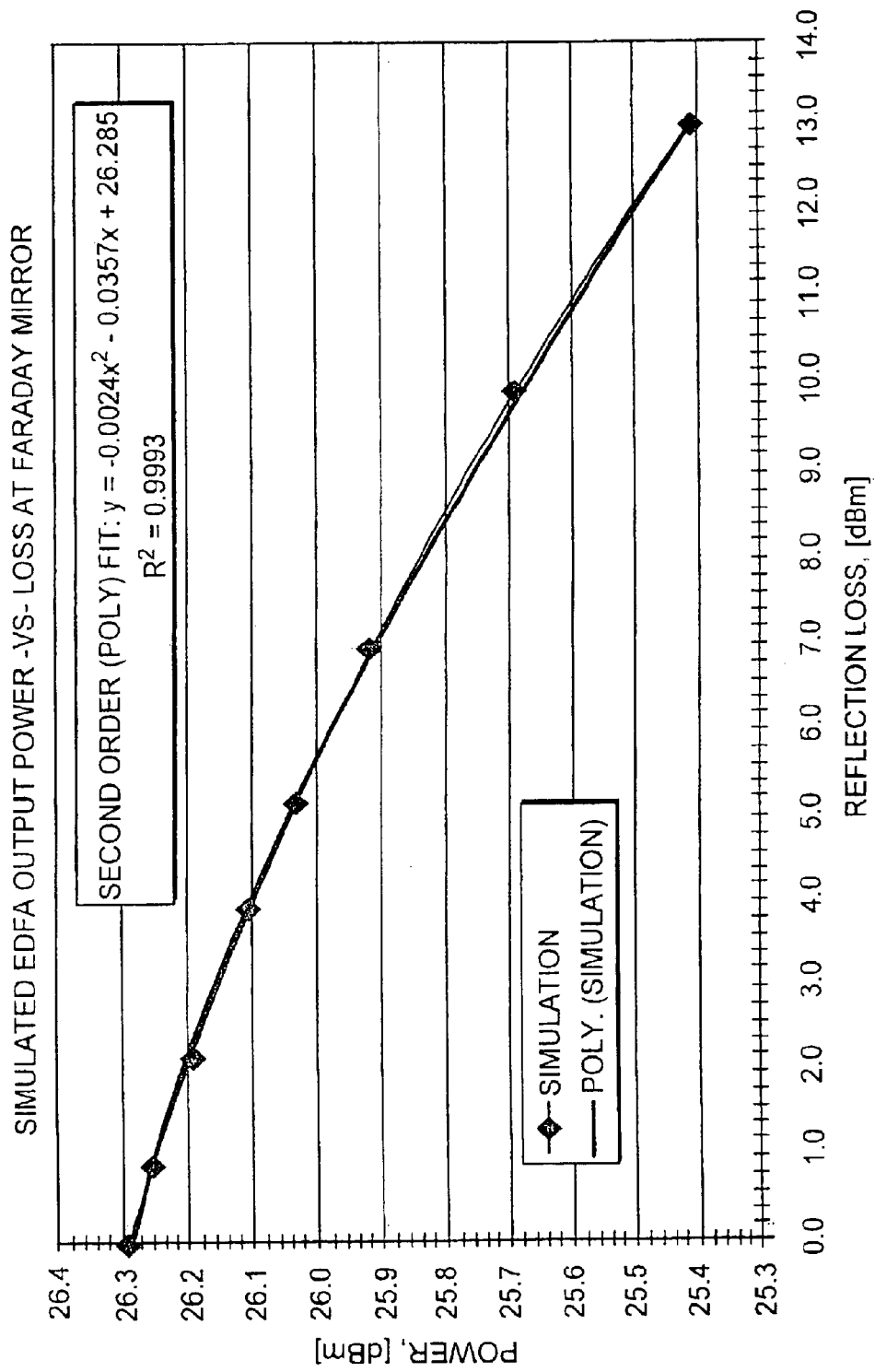
FIG. 7B is a simulated plot of output power versus reflection loss (or attenuation) within the loss-insensitive region for a two-stage double-pass EDFA with Faraday rotator mirror shown in FIG. 6.

FIG. 7B illustrates this clearly by plotting calculated output power as a function reflection loss at the Faraday mirror within the loss-insensitive region, along with a second order curve fit.

The output power ($P_{out}$) from an optical amplifier as a function of input power ($P_{in}$) is approximately described by:

$$P_{out}=P_{in}G(P_{in})=P_{in}g_o/(1+g_oP_{in}/P_{sat\_out})$$

where $G(P_{in})$ is the power dependent gain, $g_o$ is the small signal gain, and $P_{sat\_out}$ is the saturated output power. The saturated output power is the maximum power that can be delivered by the amplifier, which corresponds to $\eta P_{PUMP}$, where $\eta$ is a conversion efficiency factor and $P_{pump}$ is the pump input power. For optical pumping, the maximum conversion efficiency $\eta_{max}$=(signal photon energy/pump photon energy)=$\lambda_{PUMP}/\lambda_{signal}$, which is ~63% for 980 nm pumped EDFA's and ~95% for 1480 nm pumped EDFA's.

Figure 5A:
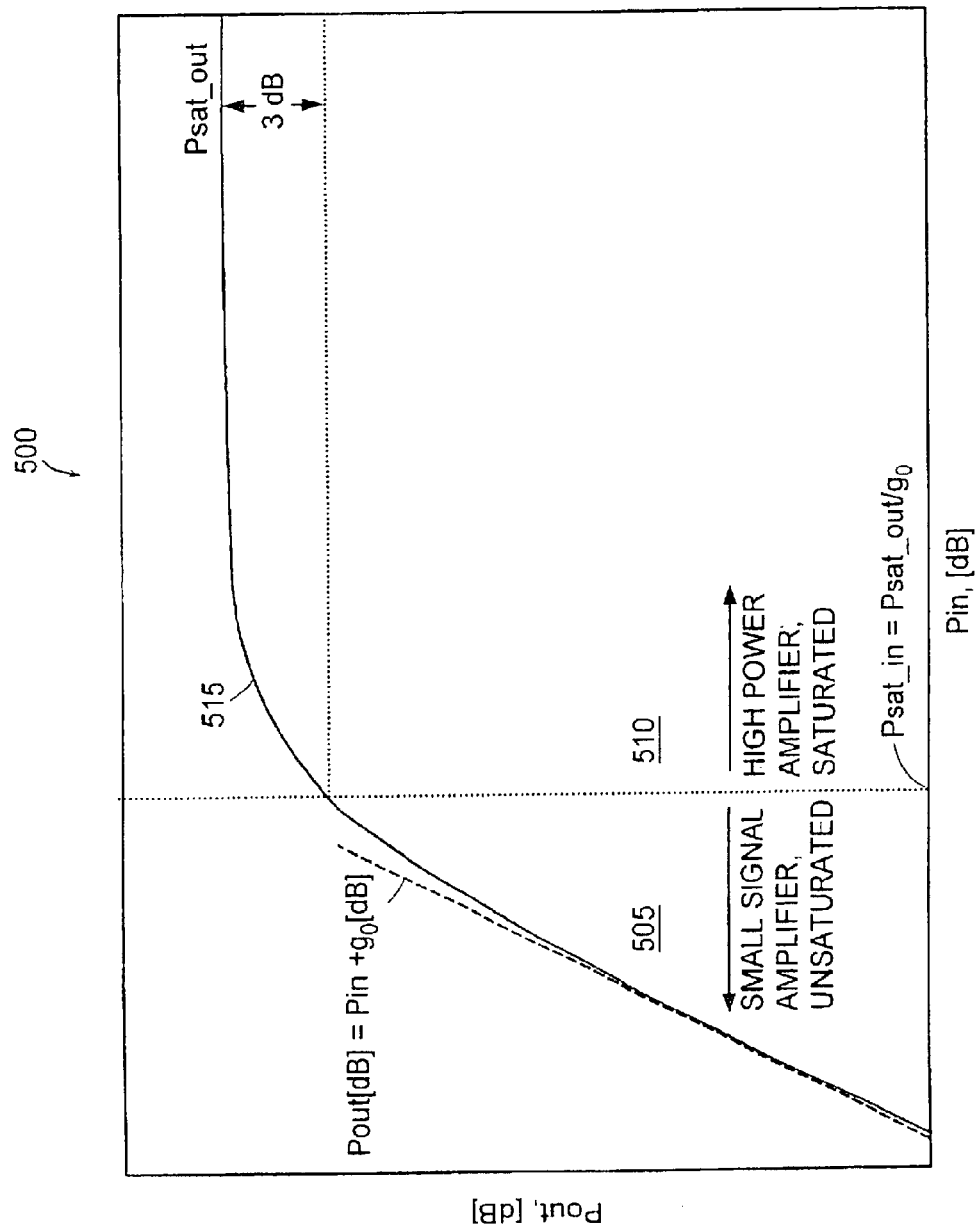
FIG. 5A is a plot of the output power versus the input power for a generic amplifier having an indication of the saturation level for the prior art amplifier of FIG. 1.
Figure 5B:
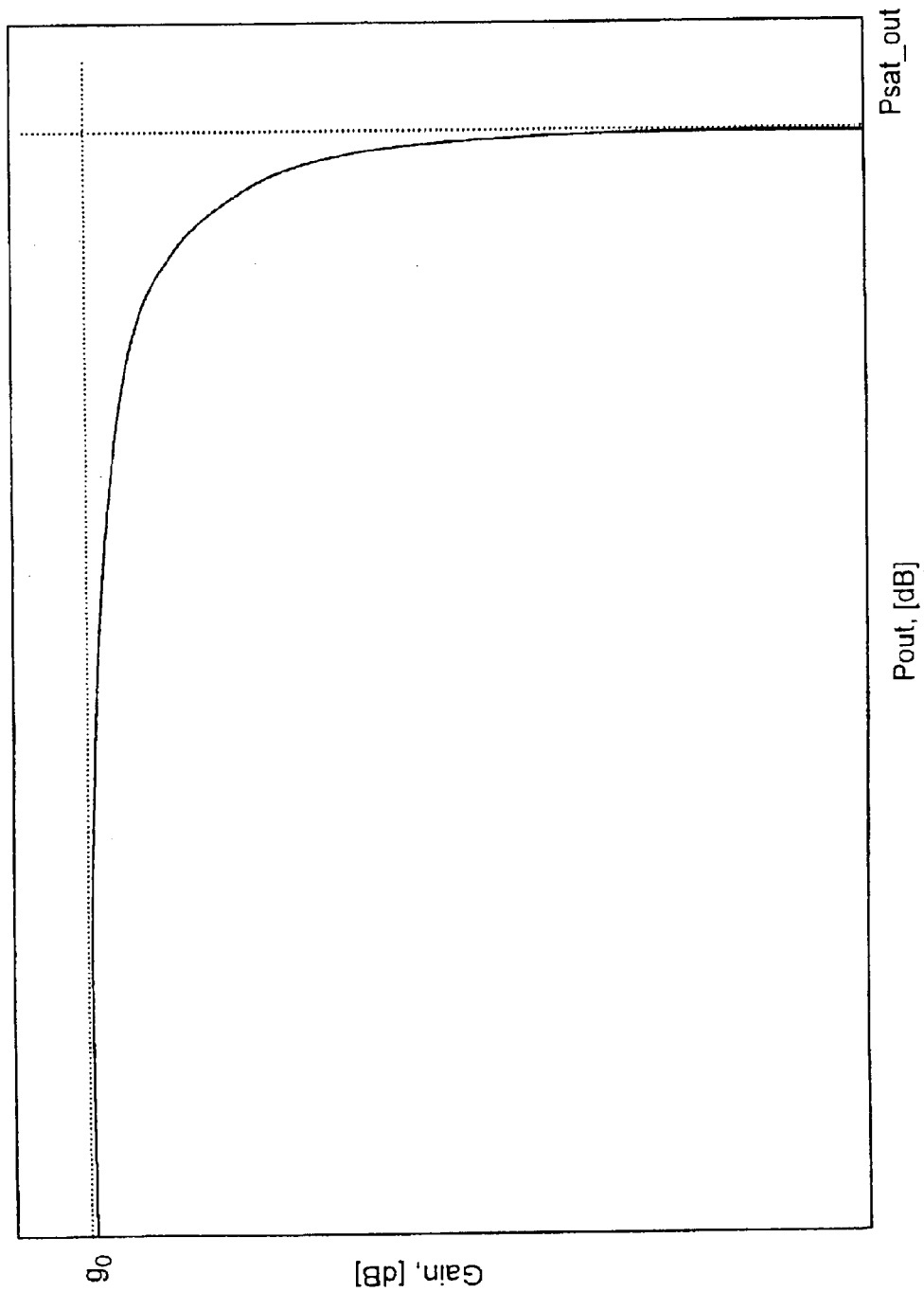
FIG. 5B is a plot of amplifier gain versus output power corresponding to the plot of FIG. 5A.

Plots of $P_{out}$ versus $P_{in}$ and Gain versus $P_{out}$ are shown in FIGS. 5A and 5B. For small input signals, the amplifier gain is high, asymptotically approaching $g_o$. When $g_oP_{in} \ll P_{sat\_out}$, the amplifier is operating in the "unsaturated" regime. Here, $P_{out} \sim g_oP_{in}$ and the output becomes a linear function of $P_{in}$. For large signals (i.e., $g_oP_{in} \gg P_{sat\_out}$), the gain becomes clamped and the output "saturated", with the output power asymptotically approaching $P_{sat\_out}$. As long as the product of $g_oP_{in} > P_{sat\_out}$, the output power becomes relatively constant, as the amplifier operates in the saturated regime. This occurs when the input power level is above the input saturation power level ($P_{sat\_in}$), which is typically defined as the input power for which the output power is at ½ the maximum, or when, $$P_{sat\_in}=P_{sat\_out}/g_o$$

Thus, high power optical amplifiers can operate in the saturated region over an extended range of input powers as long as the amplifier has high gain. For the amplifier with characteristics shown in FIGS. 7, 8, 11A and 11B, $P_{sat\_out}$~400 mW or 26 dBm, $g_o$~50,000 or 47 dB, and therefore, $P_{sat\_in}$~8 $\mu$W or −21 dBm. Note that in order to operate stably, the round trip gain, $G(P_{in})$ must be less than the round trip loss.

Figure 8:
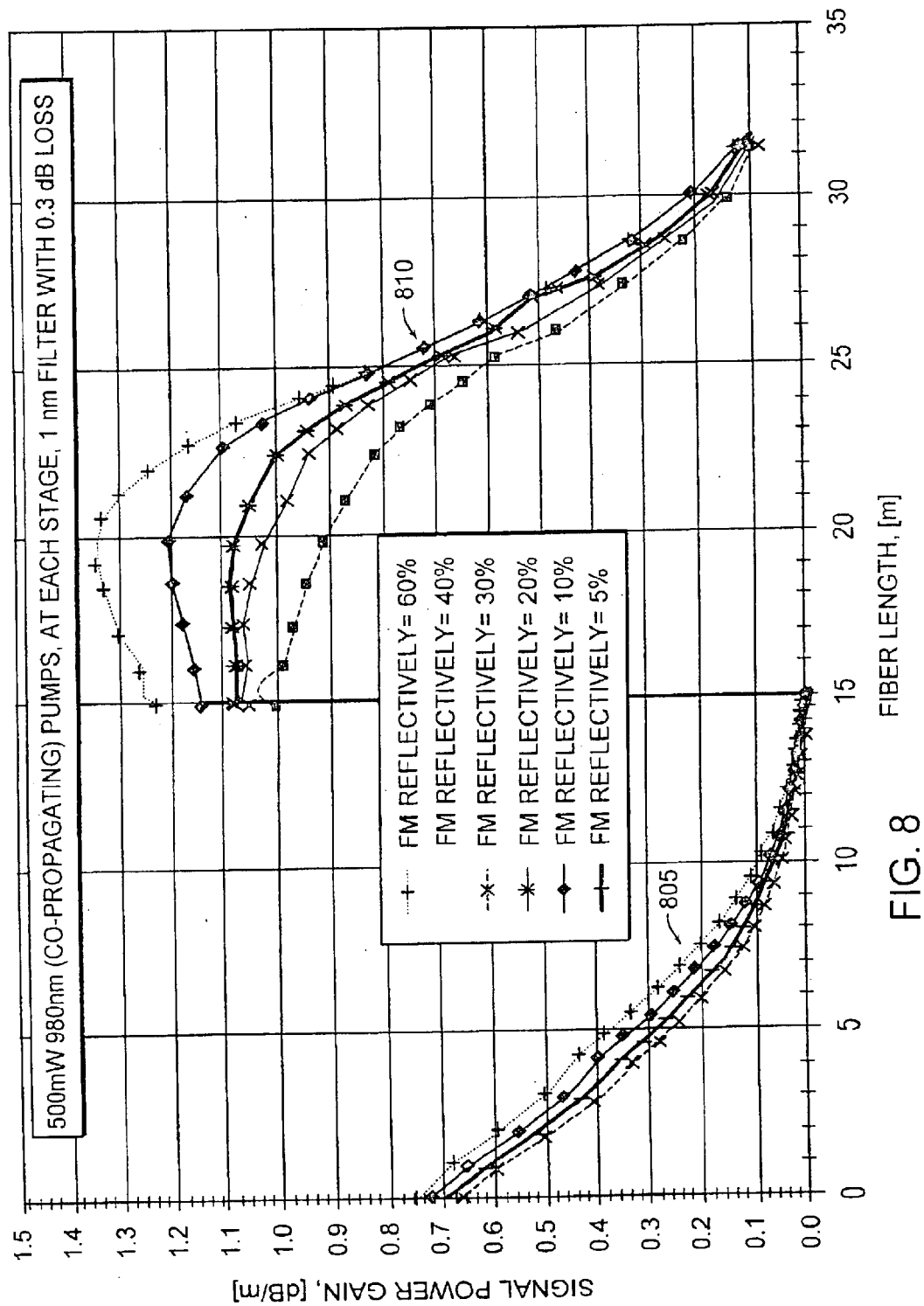
FIG. 8 is a plot of signal power gain versus fiber lengths of the optical amplifier of FIG. 6.

FIG. 8 is a plot of a simulated gain profile through the 500 mW, 980 nm (co-propagating) pumps at each stage. A 1 nm filter with a 0.3 dB loss filters the input signal. Similar to FIG. 7A, simulated curves are presented for a range of Faraday mirror (FM) reflectivities, as indicated. The left set of curves 805 indicate the gain through the fiber from 0 meters to 15 meters. The gain decreases asymptotically toward zero as the optical signal approaches the end of the 15 m fiber. Similarly, at the beginning of the fiber, the set of right curves 810 have higher gain and decrease as indicated as the signal reaches the end of the 17 m fiber.

Figure 9A:
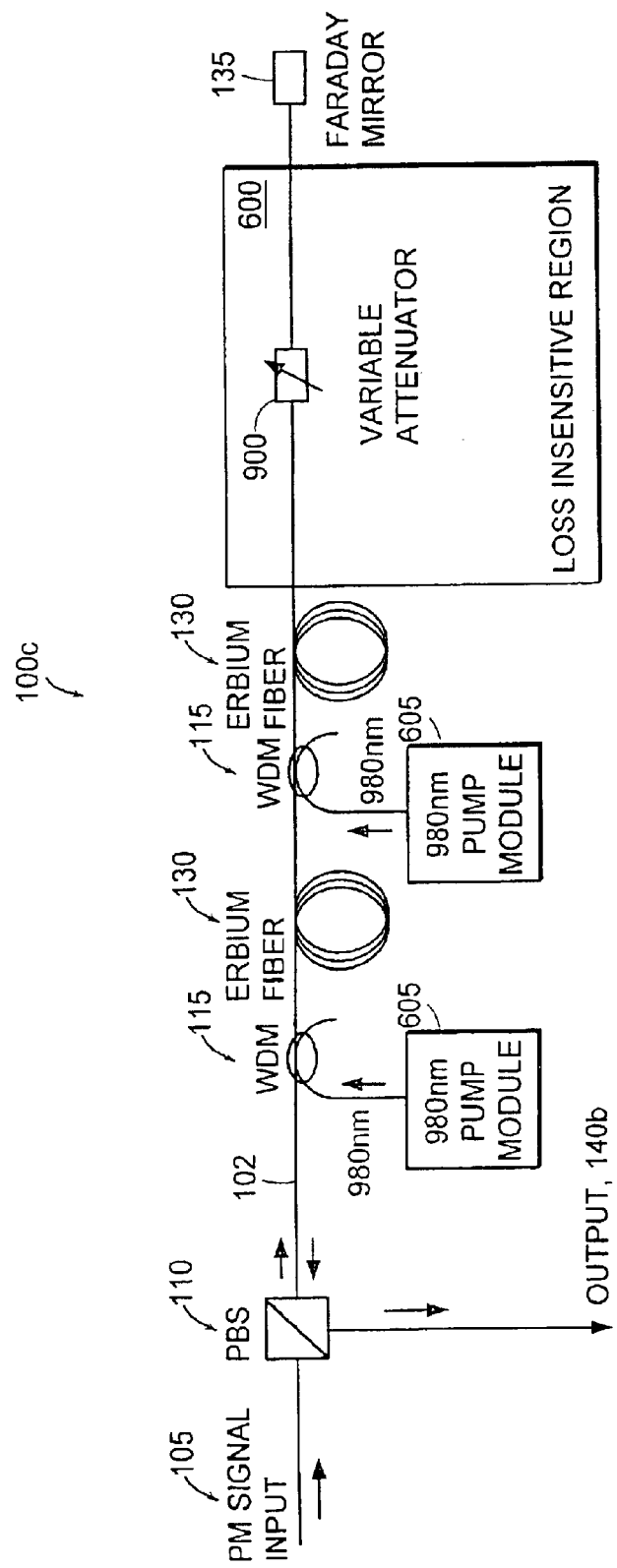
FIG. 9A is a schematic diagram of the optical amplifier of FIG. 6 employing a variable attenuator in the loss-insensitive region.

FIG. 9A is an embodiment of the EDFA 100c that includes a variable attenuator 900 in the loss-insensitive region 600. The variable attenuator 900 is used to demonstrate the trend in sensitivity of the saturated output 140b versus an attenuation of the optical signal caused by attenuation in the loss-insensitive region 600.

Figure 9B:
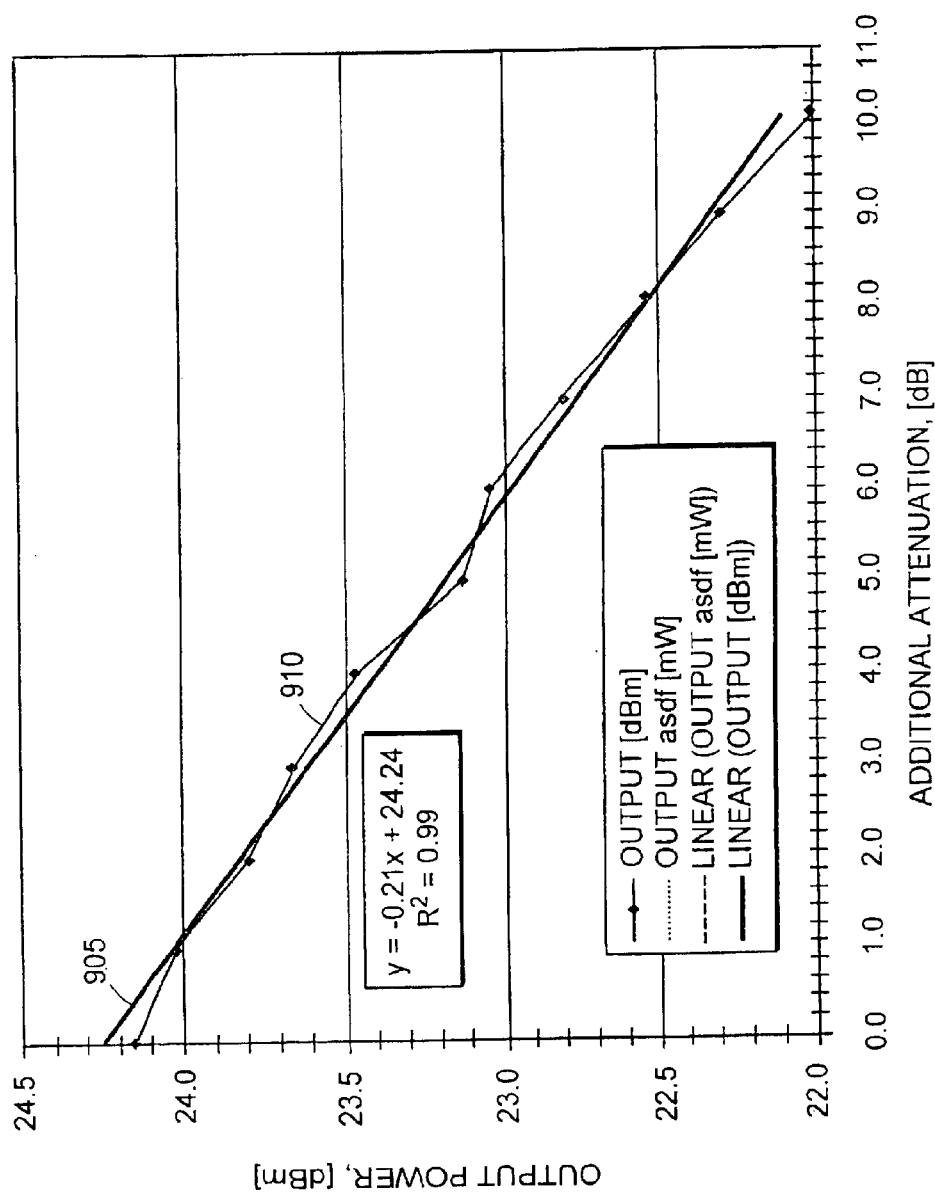
FIG. 9B is a plot of output power of the optical amplifier versus additional attenuation introduced by the variable attenuator of FIG. 9A.

FIG. 9B is a plot of a measured sensitivity curve 910, and linear regression curve 905, of the output power in dBm versus additional attenuation in dB, as applied to the twice-amplified signal by the variable attenuator 900. In response to the variable attenuator 900 changing in 1 dB increments from 0 db to 10 db, the output power ranges between about 24.15 dBm to about 22.0 dBm.

As indicated in the plot, the linear regression curve 905 has a slope of −0.2, indicating that the output signal 140b is reduced by approximately 0.2 dB for every 1 dB of attenuation in the loss-insensitive region 600. Thus, it is possible to improve performance of the EDFA 100b with relatively negligible effects on the output power of the output signal 140b through the use of optical elements having less than optimal insertion losses.

Theoretical simulations suggest even better insensitivity to loss in the loss-insensitive region, with less than 1 dB of output power being lost for over 13 dB of additional attenuation (or reflection loss), which corresponds to less than 0.1 dB of output power reduction 140b for every 1 dB of attenuation in the loss-insensitive region. The simulation is shown in FIG. 7B, which is a simulated sensitivity curve and second order fit of the output power in dBm versus additional attenuation in dB, as applied to the twice-amplified signal by the variable attenuator 900. The simulated response in FIG. 7B is qualitatively in agreement with the trend of the measured sensitivity in FIG. 9B in that there is a substantial reduction of the impact of attenuation in the loss insensitive region on the output power 600. The differences between the theoretical and measured sensitivity curves can be accounted for by the several reasons, including:

1) the attenuating device 900 used in the experiment have fiber connectors with large enough back reflections to destabilize the amplifier, resulting in the fluctuations in the data of FIG. 9B; and
2) the lengths and characteristics of the erbium fiber, the pump power levels, and input signal levels for the experiment were different from those of the simulation, since (i) the experiment was performed on an early EDFA prototype and (ii) the simulations were performed on a later version, when more powerful pumps were available.

Nevertheless, the trends for both the theory and experiment are consistent, showing a substantial reduction of the impact of attenuation in the loss-insensitive region on the output power.

Figure 10A:
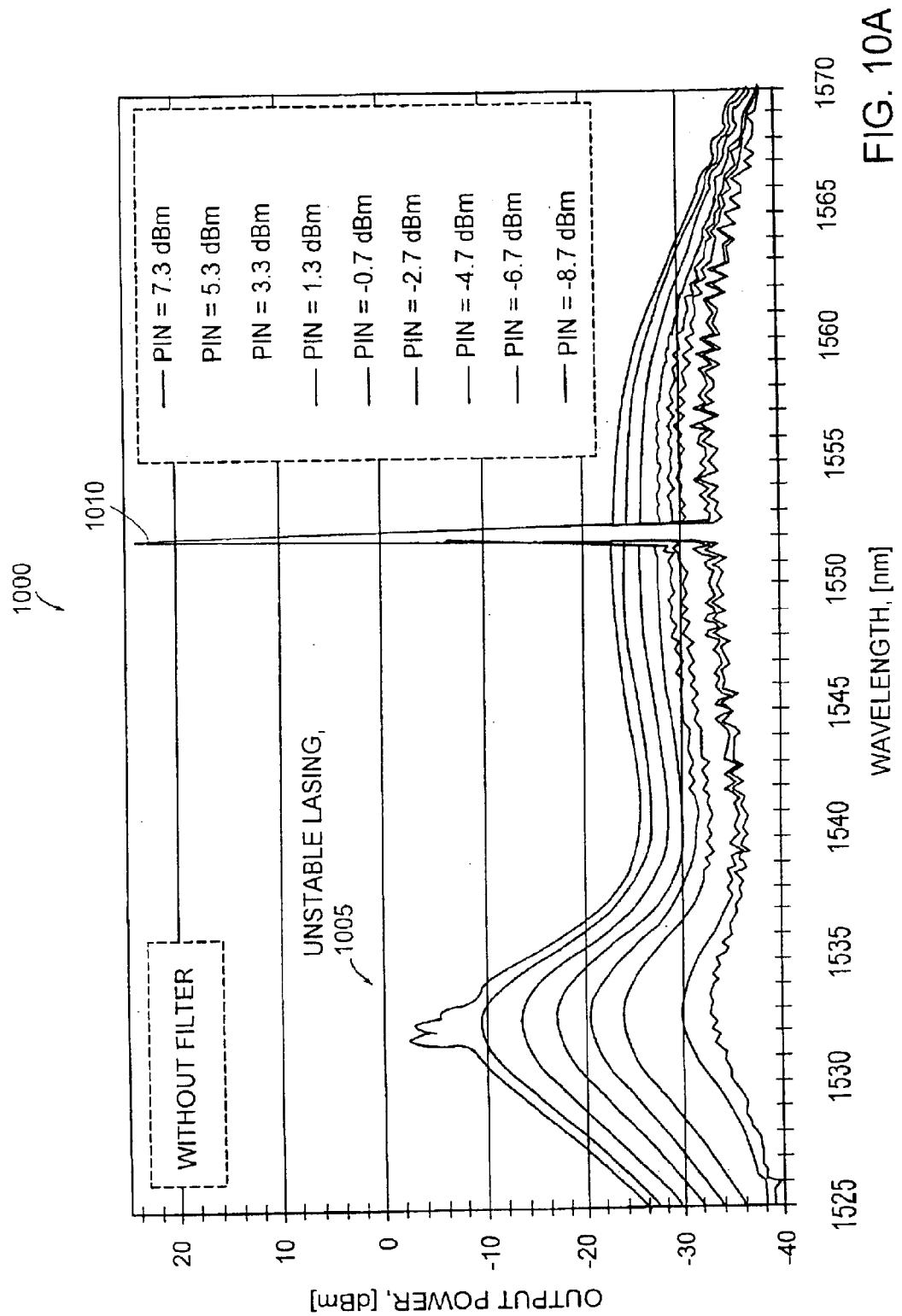
FIG. 10A is a plot of output power versus wavelength for the prior art optical amplifier of FIG. 1.

Turning now to functional aspects of employing optical elements in the loss-insensitive region, FIG. 10A is a plot of a set of output signals 1000 across a spectrum of wavelengths as produced by the EDFA 100a (FIG. 1). The set of curves is produced for input signals 105 having power levels ranging from 7.3 dBm to −8.7 dBm in 2 dBm increments.

As expected, a sharp peak 1010 is observed at the signal wavelength, which is about 1552 nm. To the left of the signal peak 1010, however, is an unstable lasing indication 1005, corresponding to an operational point at which the EDFA is close to oscillation. Because the set of curves range, from bottom to top, from to the highest input power, 7.3 dBm, to the lowest input power, −8.7 dBm, it should be understood that the EDFA 100a is most unstable when the input power of the input signal falls below a threshold, which occurs when the round trip gain (for a single polarization) approaches the round trip loss, which in this case is less than about −7 dBm.

As well known in amplifier technology, instability can cause an amplifier to self-destruct, both in electronic amplifiers and optical amplifiers. An example of an unstable optical amplifier self pulsing is shown in FIG. 10B. In this case, the 300 mW average output power from the amplifier pulses to potentially damaging peak power levels exceeding 60W. Unstable lasing and ASE also use energy stored in the erbium-doped fiber 130 (FIG. 1), which therefore lowers the amount of energy in the erbium fiber to be used for amplifying the optical signal, and, thus, reduces the peak 1010 of the output signal 140a.

Figure 11A:
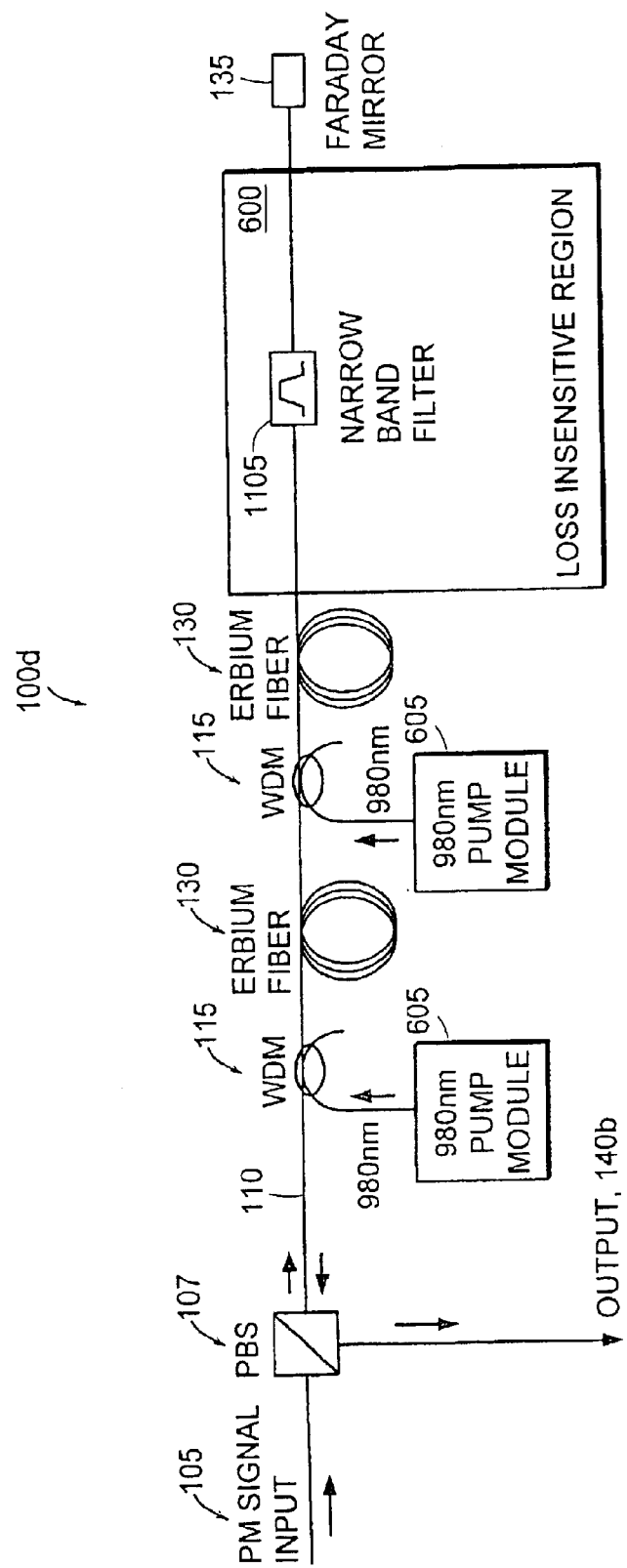
FIG. 11A is an embodiment of the optical amplifier of FIG. 6 employing a narrow-band filter in the loss-insensitive region.

In accordance with the teachings of the present invention, the EDFA 100d of FIG. 11A reduces instability, observed in the 1532 nm wavelength range, through use of a narrow-band filter optically disposed in the loss-insensitive region 600. The narrow passband filter 1105 is centered wavelength-wise about the optical signal 1552 nm, strongly attenuating out-of-band gain and ASE noise, filtering out negative effects from the optical signal being amplified and on the EDFA 100d caused by unstable lasing at 1532 nm.

Figure 11B:
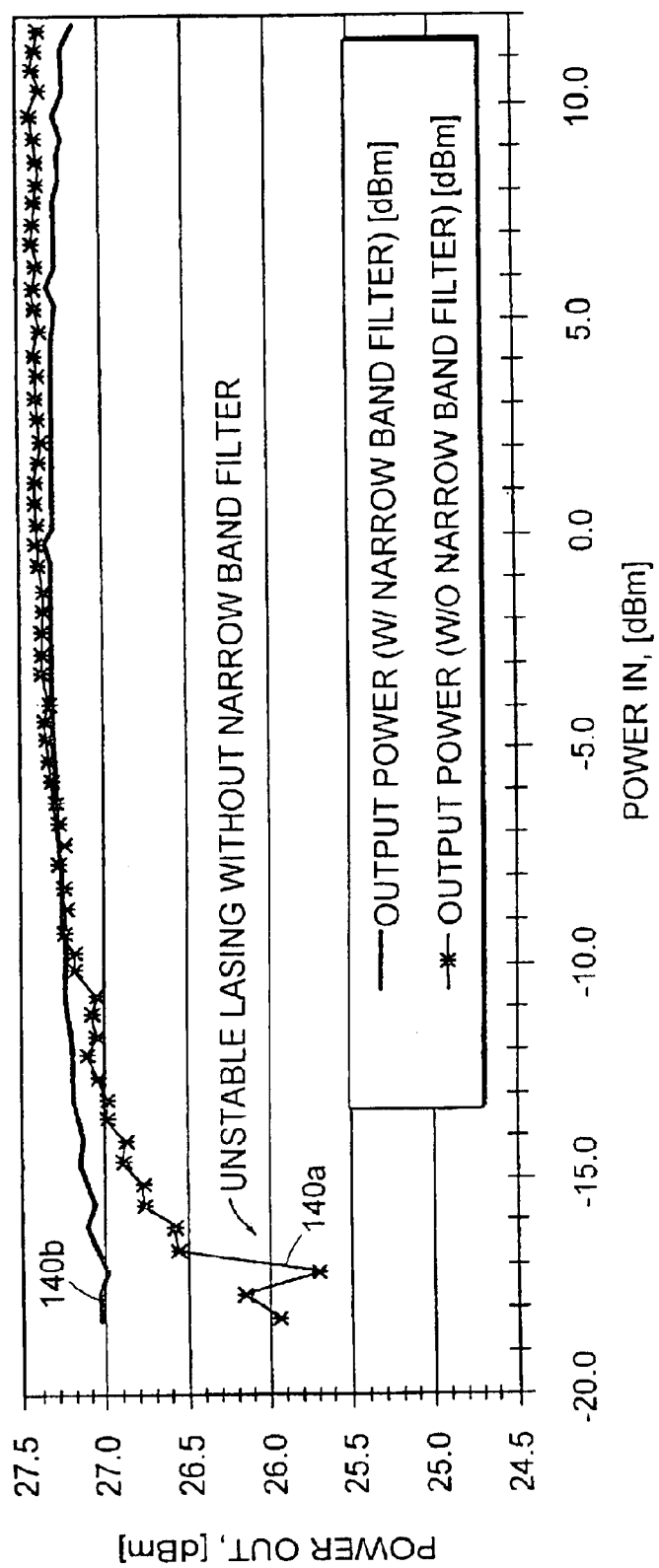
FIG. 11B is a plot of output power versus input power transfer function curves for the optical amplifiers of FIGS. 1 and 11A.

The gain curves of FIG. 11B clearly depict the advantage of using the narrow-band filter 1105 to filter out wavelengths causing instability in the EDFA 100d (FIG. 11A). The output is stabilized without loss in Pout despite filter losses. In particular, below −10.0 DB, the power of the output signal 140a of the prior art EDFA 100a (FIG. 1) falls off rapidly, ending in instability, and eventually oscillation. In contrast, by employing the narrow-band filter 1105 into the EDFA 100d (FIG. 11A) employing the principles of the present invention, the power output level of the output signal 140b is relatively constant across the 30 dB range in input power levels, most notably at low input signal 105 power levels.

Figure 12:
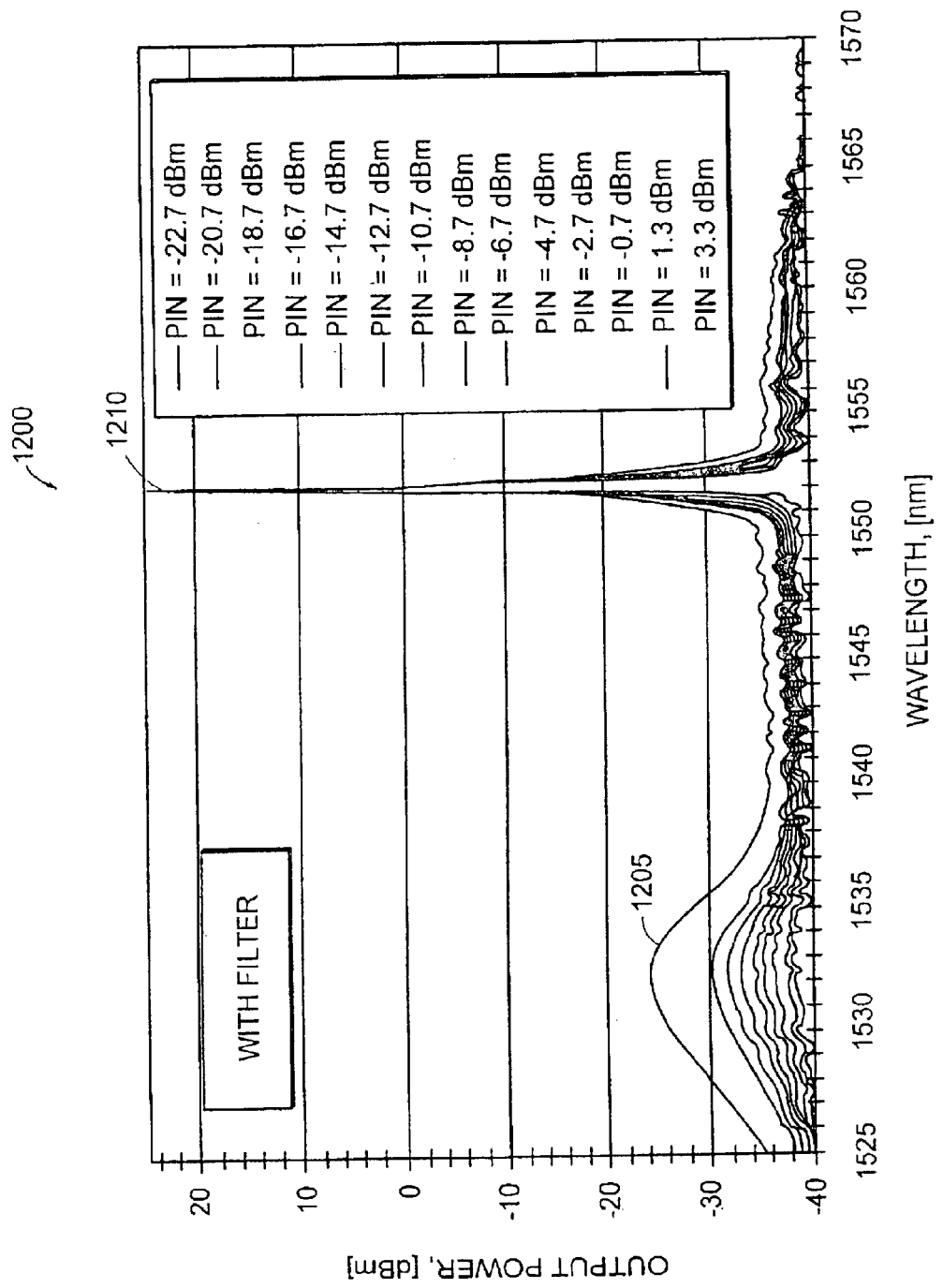
FIG. 12 is a plot of the output power versus wavelength similar to FIG. 10A but for the present invention optical amplifier of FIG. 11A.

Turning now to the wavelength spectrum of FIG. 12, as compared to the plot of FIG. 10A, two properties are clear: first, the signal peak 1210 at the amplified signal wavelength is maintained over a wide range of input power levels, and second, out-of-band ASE is suppressed over a wide dynamic range of input powers, resulting in several benefits. First, suppressing out-of-band ASE increases the lasing threshold at the ASE peak, which improves stability. Second, suppressing out-of-band ASE provides additional gain and power at the signal wavelength. Third, suppressing out-of-band ASE increases the signal-to-noise ratio to greater than 30 dB (i.e., SNR>30 dB), even at the lowest input power of the input signal. These benefits are important in that the EDFA 100d is insensitive to a wide range in input signal 105 power level variations.

Figure 13:
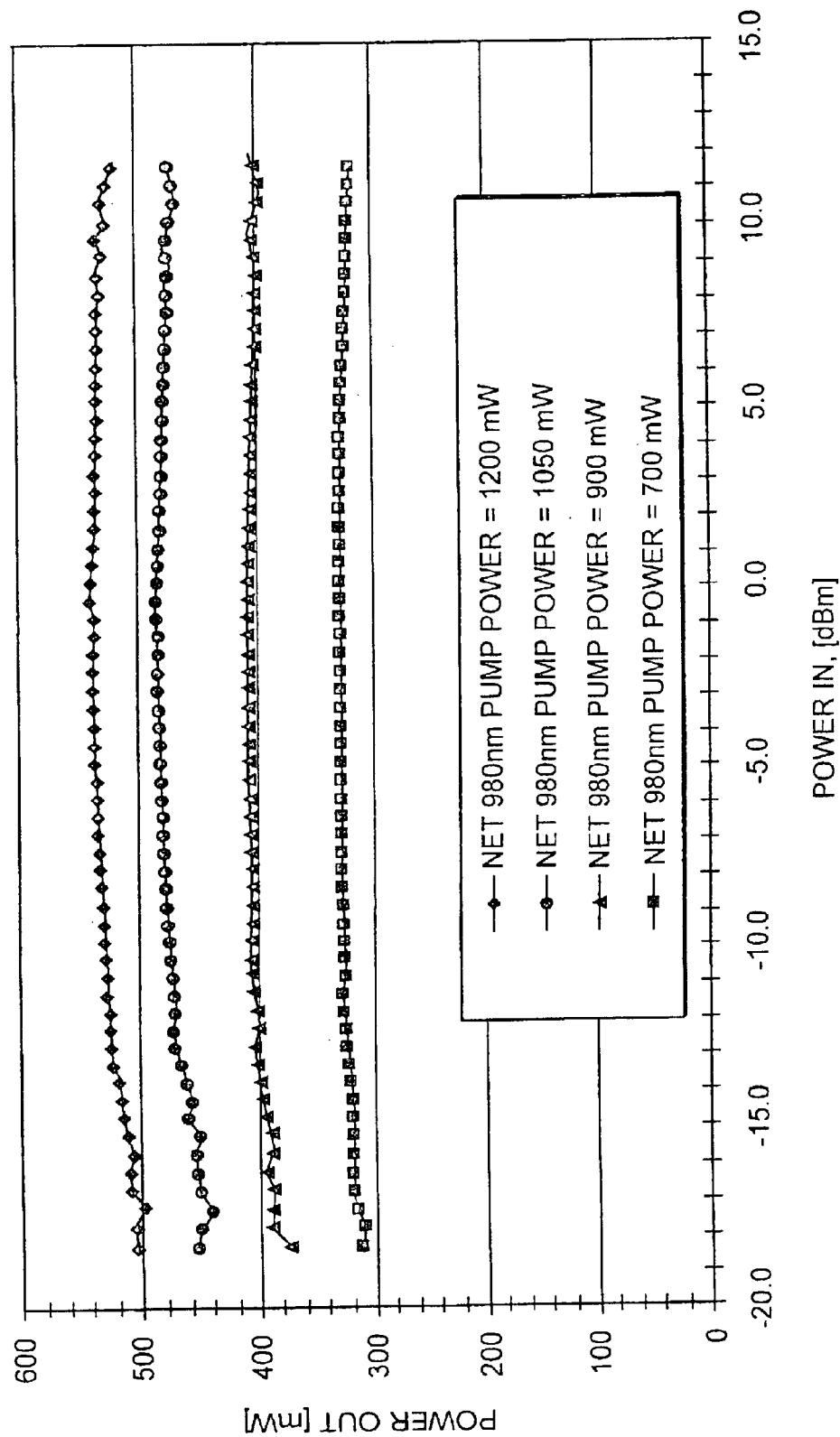
FIG. 13 is a set of plots of output power versus input power for the optical amplifier of FIG. 11A.

FIG. 13 is a plot of a set of gain curves for the EDFA 100d for a series of pump powers for the 980 nm pump modules 605. The input signal power producing the gain curves is kept constant. The gain curves were produced by the EDFA 100d using the narrow-band filter 1105 (FIG. 11A) in the loss-insensitive region 600. It should be understood that a band-pass filter, band-reject filter, or notch filter may be used to remove out-of-band ASE wavelengths that are detrimental to the amplification of the optical signal.

Figure 14A:
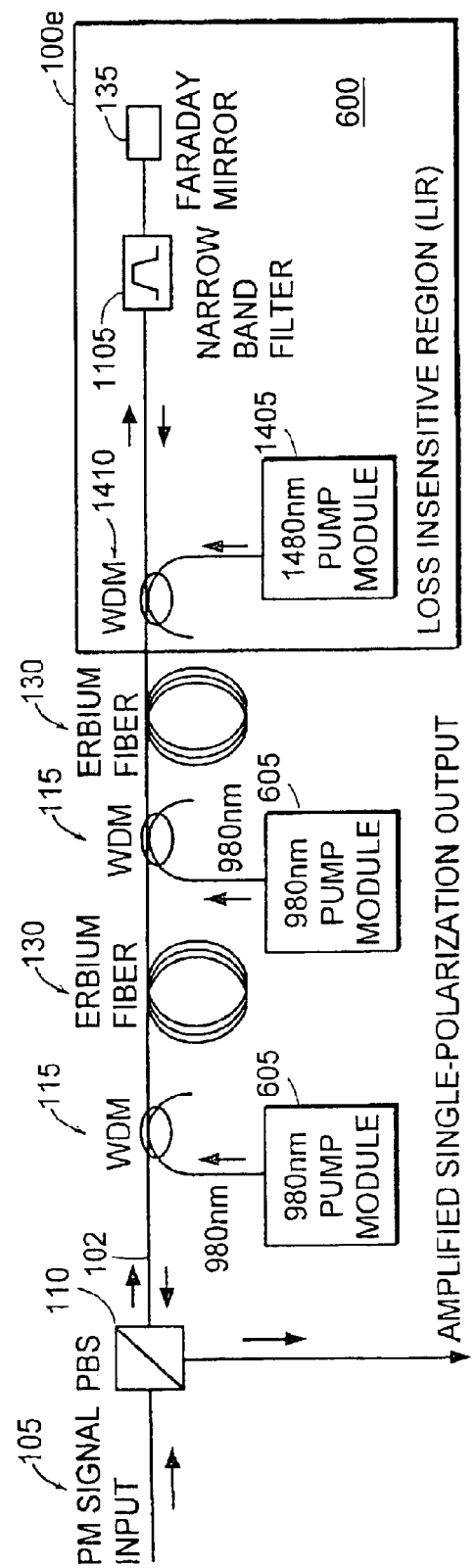
FIGS. 14A–14C are block diagrams of various embodiments of the optical amplifier of FIG. 11A also including at least one WDM in the loss-insensitive region and spare energy pumps in the loss-sensitive and loss-insensitive regions.
Figure 14B:
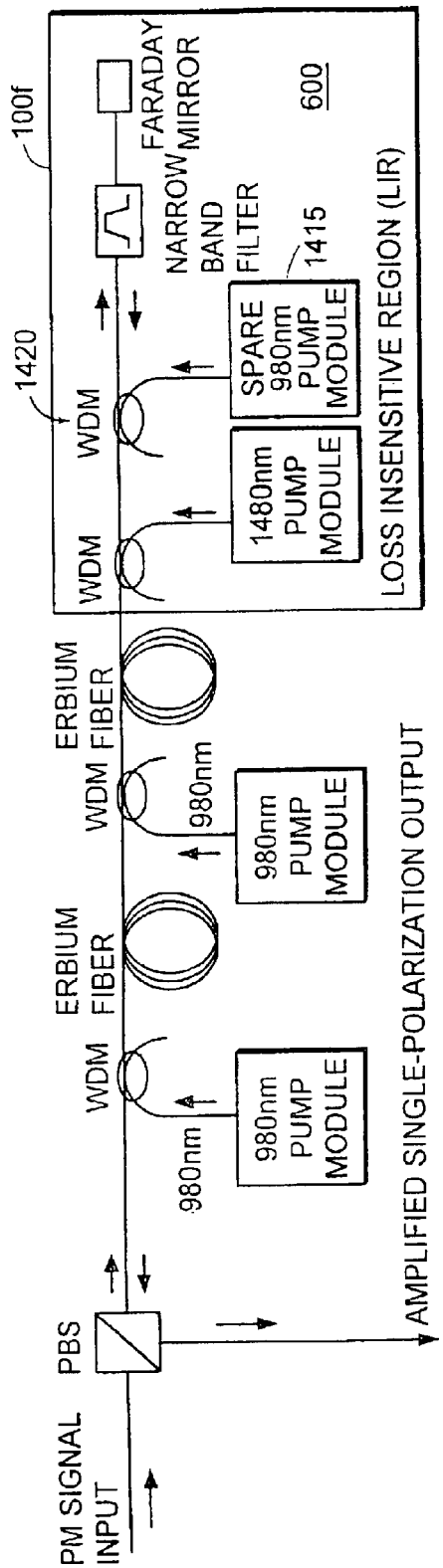
Figure 14C:
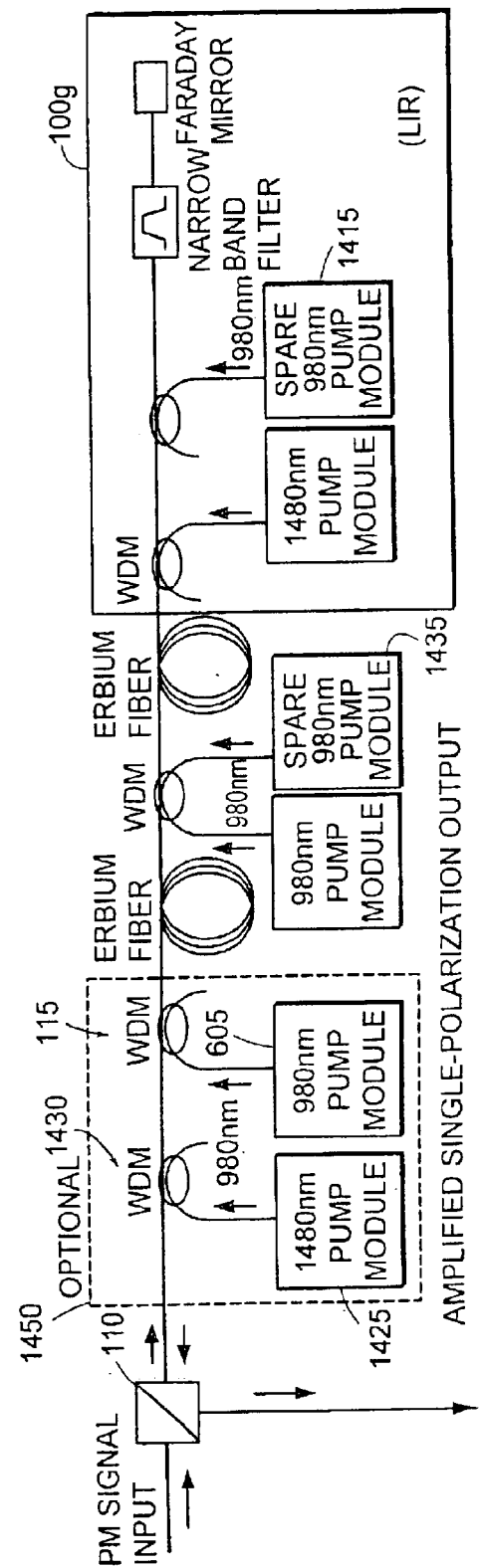

FIGS. 14A–14C illustrate three stable, efficient, high-gain, high-power, single-polarization, fault tolerant optical amplifiers with slightly different power generating capability, efficiency, and redundancy.

FIG. 14A is a block diagram of an EDFA 100e having dual pumping wavelengths, where a second pumping wavelength corresponding to a 1480 nm wavelength is asserted in the loss-insensitive region 600. In this embodiment, the loss-insensitive region 600 includes a WDM 1410 coupling a 1480 nm pump module 1405 to the optical medium in the reverse pass direction. A 980 nm pump module is preferably not used because pump modules outputting the same wavelengths and facing each other cause interference with each other.

There are certain benefits to adding dual wavelength pumping to an optical amplifier, and, in particular, 1480 nm to the EDFA 100e. First, the EDFA 100e experiences an increase in output power with negligible change in efficiency. Second, the 15 m and 17 m erbium-doped fibers are nearly optimal for both 980 nm (2-stages) and 1480 nm (1-stage) pumping. Third, 1480 nm pump wavelengths are much less sensitive to radiation darkening than 980 nm, making 1480 nm pumping particularly attractive for space laser communications. Fourth, the 1480 nm pump and WDM can simply be used as a spare, providing an additional fall back mode without impacting output power or efficiency.

The amplifier in FIG. 14B provides extra redundancy with the addition of another 980 nm WDM 1420 and a spare 980 nm pump 1415 in the loss-insensitive region 100f. Should the center 980 nm pump 605 fail, the spare 980 nm pump 1415 could be used with negligible impact on performance. Since the pump lasers are the least reliable elements within the amplifier, this design provides increased reliability and redundancy (of the weakest elements), with minimal impact on efficiency.

FIG. 14C provides further redundancy with the addition of another spare 980 nm pump 1435, and an optional 1480 nm WDM 1430 and pump 1424, which can be used to increase output power and provide redundancy. While the addition of the redundant 980 nm pump 1435 does not impact amplifier efficiency, the additional, optional, 1480 nm WDM 1430 is in the loss-sensitive region, and, therefore, will reduce the amplifier output power and efficiency by the insertion loss of the WDM 1430. Alternatively, the optional 1480 nm pump 1425 and associated WDM 1430 can be placed prior to the PBS 110, removing the WDM 1430 from the loss-insensitive region 100g. However, in this case, the pump 1425 experiences the additional loss of the PBS 110, which reduces the efficiency of the pump 1430. The 980 nm pump 1435 can also be used as a primary pump source. Doing so provides an additional choice of removing the optional elements 1450 in critical path and the loss-sensitive region.

By replacing the PBS 110 with a standard or polarization-maintaining (PM) circulator, polarization independent performance can be attained. Also, while shown here for single mode pumping, cladding pumped designs can be used with the double-pass configuration as well, to achieve a stable, high-gain, high power amplifier.

The WDM 1410 typically has an insertion loss of 0.1 dB. Thus, using the linear regression curve 905 (FIG. 9B), the loss at the output is 0.02 dB, translating into about a 2% loss in the double pass design. Additionally, the 1480 nm pump module provides high reliability by providing a redundancy for amplifying the optical signal.

Figure 15:
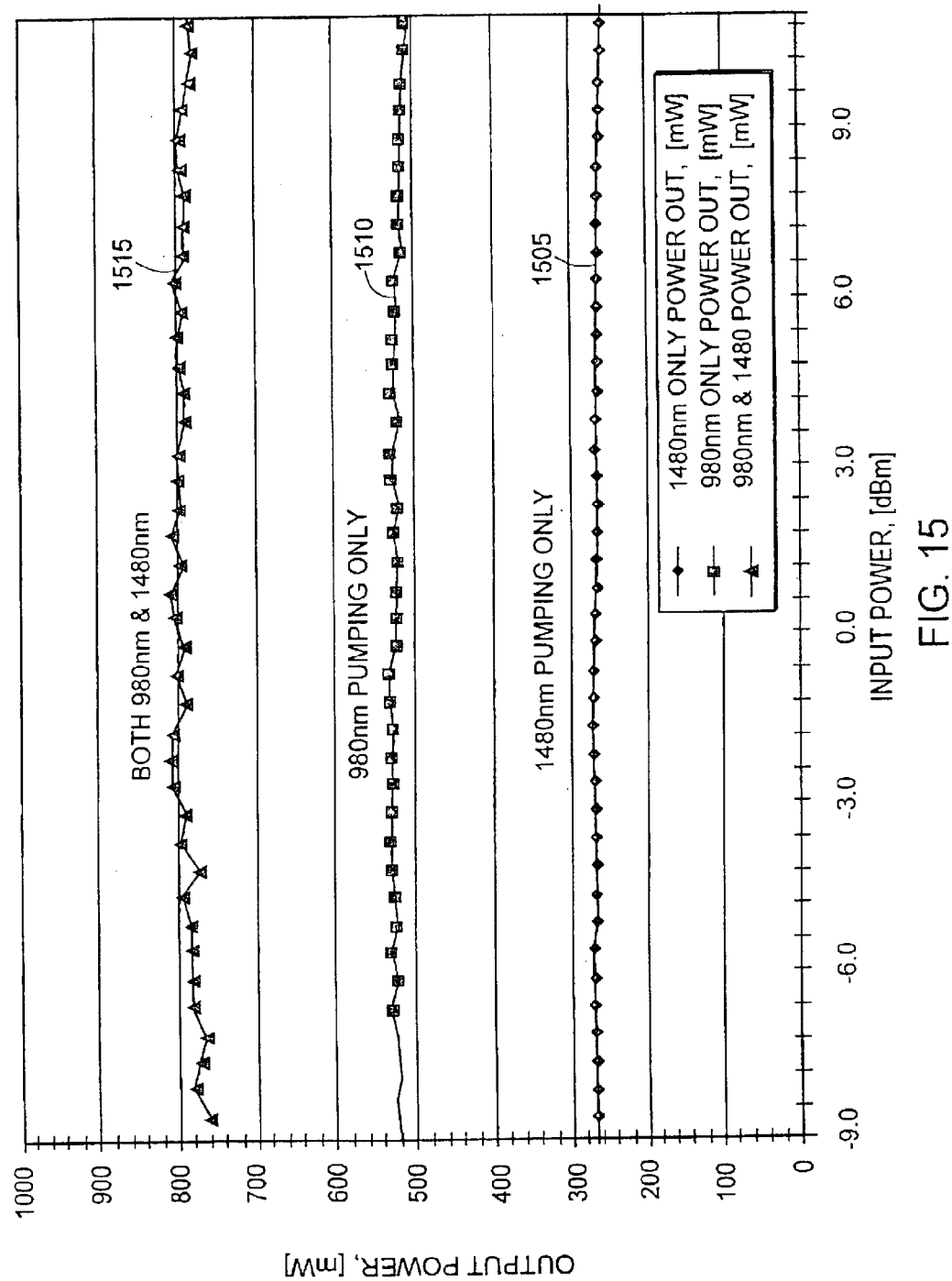
FIG. 15 is a plot of the output power versus input power for the optical amplifier of FIGS. 14A–C.

FIG. 15 provides curves 1505, 1510, and 1515 illustrating the increase in gain and redundancy provision resulting from including a 1480 nm pump module 1405 (FIGS. 14A–C) in the loss-insensitive region of the EDFA 100e (FIG. 14A). Using the 1480 nm pump module only, the EDFA 100e produces an output power of about 260 mW for an input power ranging from −9.0 dBm to +10 dBm. Employing a 980 nm pump module only, the EDFA 100e produces an output curve 1510 of about 520 mW across the input power range. Employing both the 980 nm and 1480 nm pumps, the EDFA 100e produces an output power curve 1515 of about 800 mW across the input power range. Thus, the output power achieved by employing both wavelength pumps is additive, but also provides the benefit of redundancy.

Figure 16:
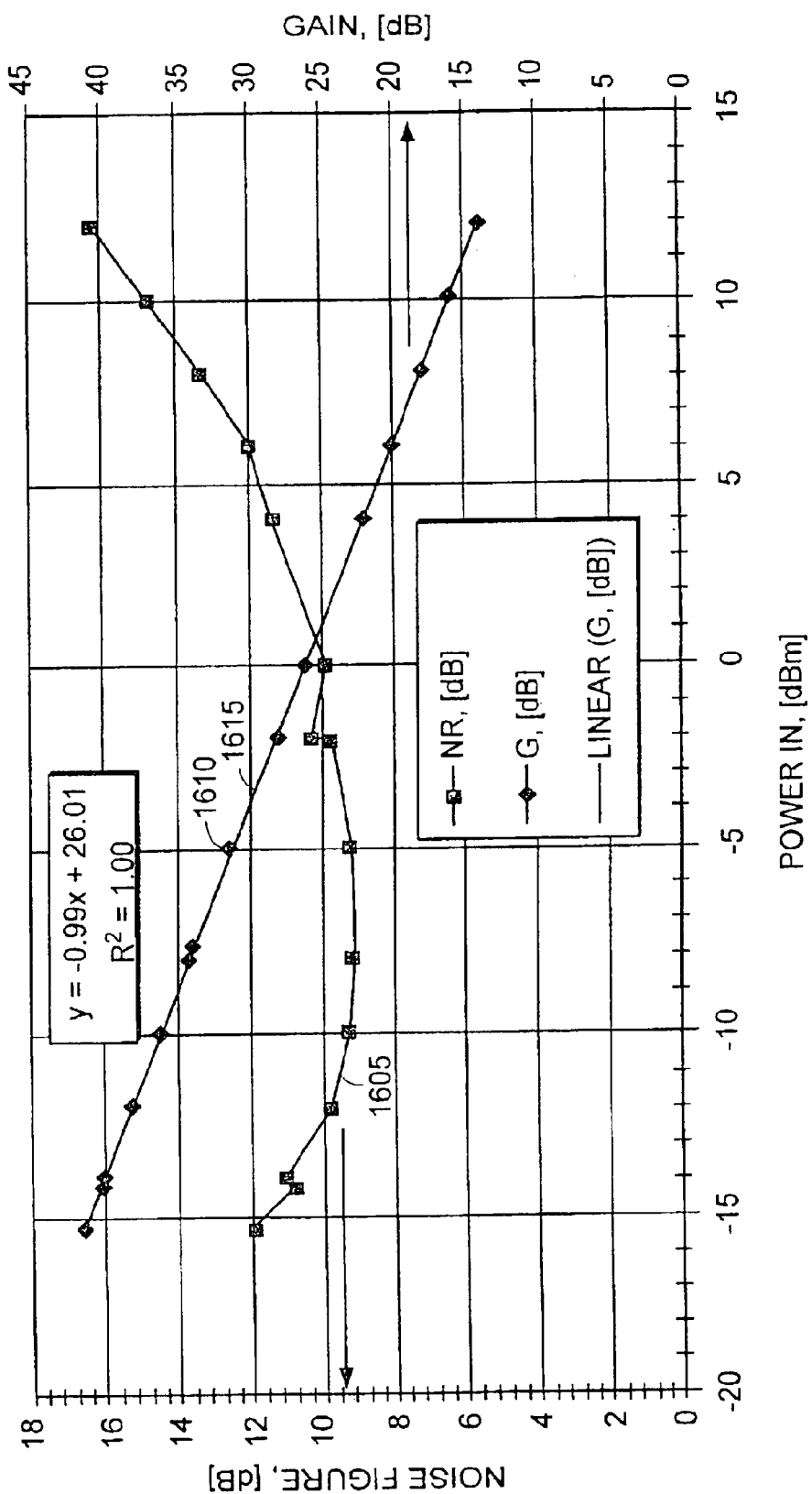
FIG. 16 is a plot indicating noise figure and gain versus input power for the optical amplifier of FIGS. 14A–C.

FIG. 16 is a plot relating gain and noise figure in dB to the input power in dBm of the polarization-maintaining input signal 105 (FIG. 6). A noise figure curve 1605 ranges from 12 dB to 16 dB in a positive parabolic shape having a minimum slightly above 9 dB. The gain data points 1610 are linear with very little variance. Feeding a standard linear regression algorithm with the gain data points 1610 produces a linear regression gain curve 1615 ranging from about 42 dB to about 14 dB in a linear, negative slope. It should be understood that a relatively high noise figure is expected for high-gain, high-power EDFA's, such as the EDFA 100e.

Figure 17:
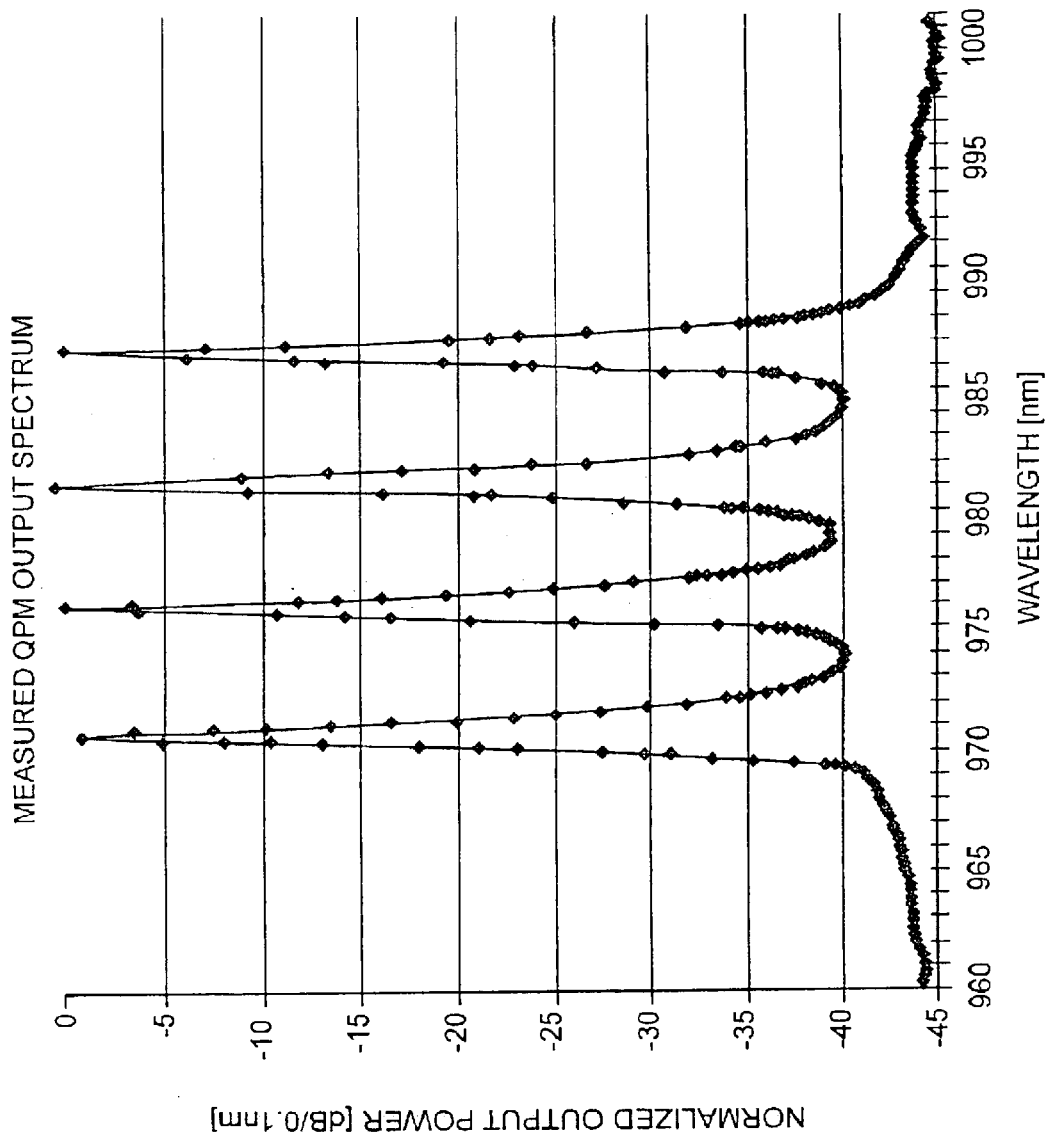
FIG. 17 is a plot of normalized output power versus wavelength of energy pumps optionally employed in the amplifier of FIG. 6.

FIG. 17 is a plot indicating a normalized output power in dB/0.1 nm versus wavelengths between 960 nm and 1000 nm having a measured 980 nm QUAD-pump module (QPM). The quad-pump module is the dense wavelength division multiplexer (DWDM) 120 (FIG. 1) combining four grating-stabilized pump lasers 125 (FIG. 1). Each pump delivers approximately 150 mW at approximately 980 nm. An advantage of using the dense wavelength division multiplexer with four diode pumps is to provide a redundant source of 600 mW pump power, providing graceful, fault tolerant degradation. The EDFA 100e (FIG. 14A) can employ the DWDM generating the output spectrum of FIG. 17. Similarly, in the loss-insensitive region 500, a DWDM having similar qualities in the 1480 nm range can be introduced.

Figure 18:
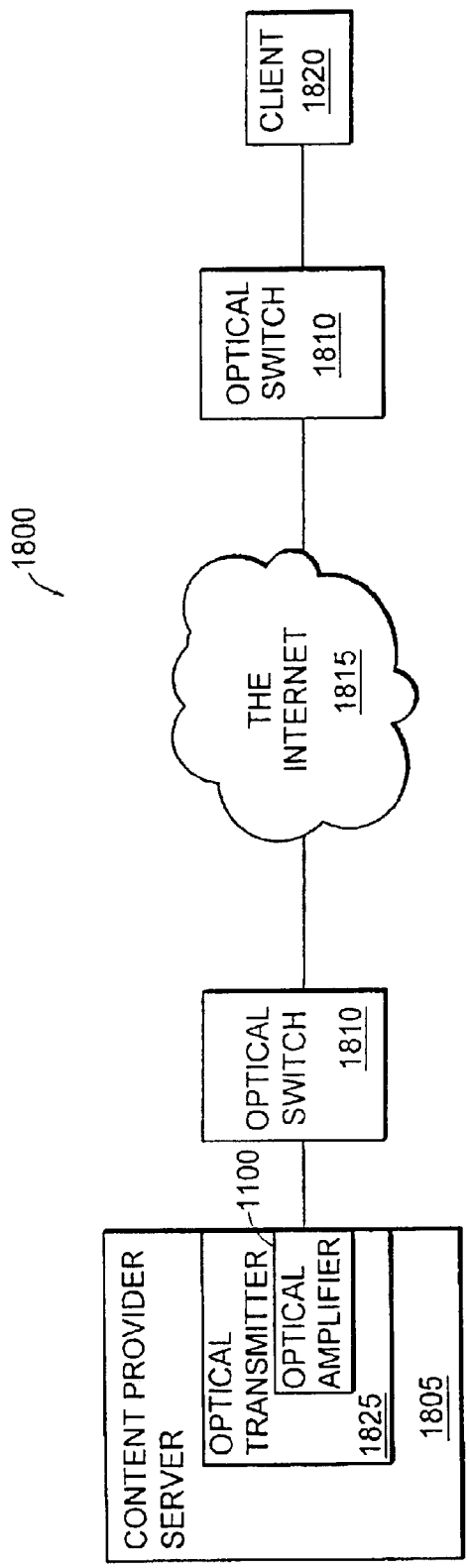
FIG. 18 is a block diagram of a data network in which the optical amplifier of FIG. 11A may be deployed.

FIG. 18 is a block diagram of an example data network 1800 employing fiber-optic interconnections and subsystems to transmit content across the network 1800. The network 1800 includes a content provider server 1805, optical switches 1810, the Internet 1815, and a client 1820. The content provider server 1805 includes an optical transmitter 1825, which employs the optical amplifier 1100, as described in FIGS. 6–17. The optical switches 1810 include an optical receiver (not shown) and optical amplifiers (not shown), preferably employing the principles of the present invention. Further, the content provider server 1805 also includes an optical receiver (not shown). Finally, the client 1820 also includes an optical receiver (not shown) and optical transmitter (not shown). The optical switches 1810 are deployed about a telephony network or the Internet. Central offices (not shown) are good places for deployment of the optical transmitters and receivers in such networks.

Most sources in modulators provide single polarization output. Free space systems typically use single polarization amplifiers; however, commercial systems typically do not use single polarization amplifiers because fiber tends not to preserve polarization, even though single polarization amplifiers generate less noise as a result of providing amplified noise in a single polarization, as opposed to two polarizations (i.e., one-half the noise), as discussed above.

It is well-known in fiber communication systems to have single polarization in receiver amplifiers for better performance, but not in the transmitting amplifiers. In such a case, a non-polarization-maintaining, conventional, fiber amplifier is followed by a polarizer. However, in the fiber amplifier and polarizer combination prior art arrangement, the polarizer must be carefully controlled to ensure maximum power passes through it. The polarizer is controlled to track the polarization of the output from the master oscillator. In this way, the polarizer allows maximum energy to pass to the optical fiber network, and, hence, to the receiver at the other end. The polarization-maintaining embodiment of the present invention obviates the need for such polarizers and polarization control.

Figure 19:
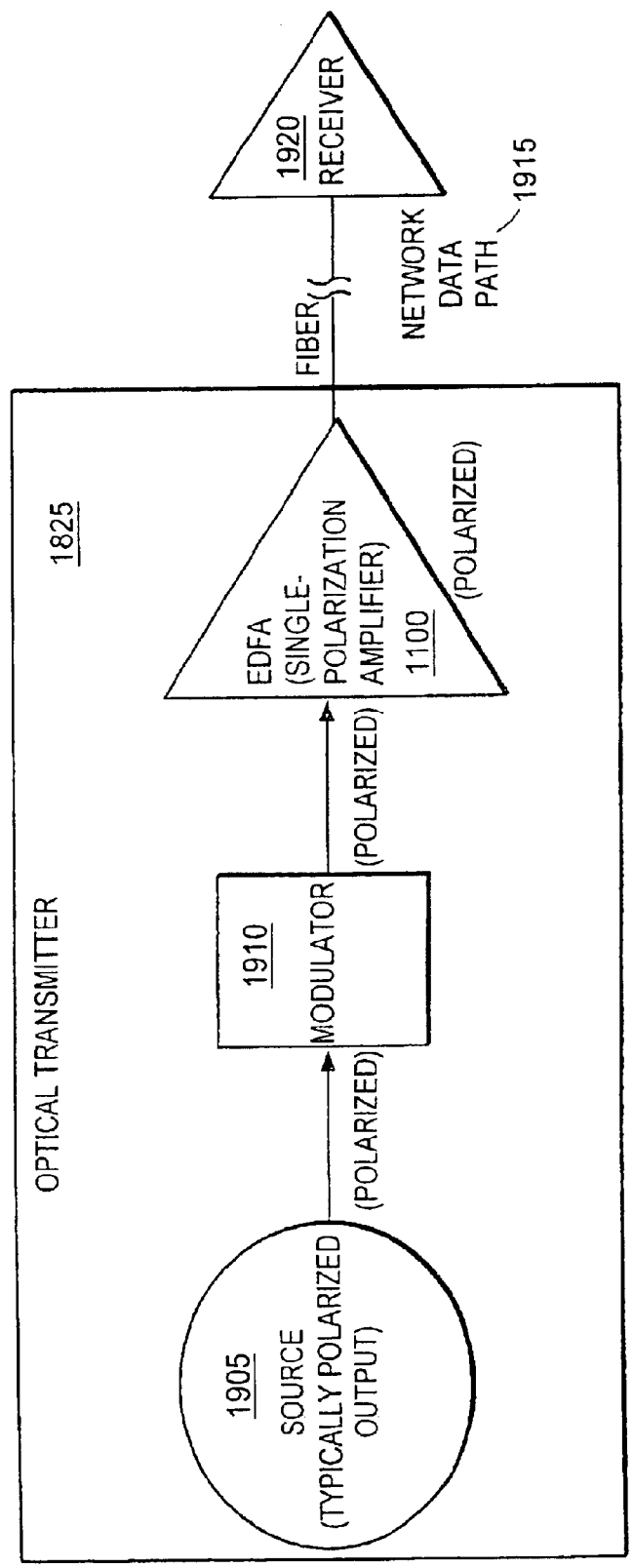
FIG. 19 is a block diagram of an optical transmitter, for the data network of FIG. 18, employing the optical amplifier of FIG. 11A.

FIG. 19 is a block diagram of the example optical transmitter 1825. The optical transmitter 1825, as described in U.S. patent application Ser. No. 09/261,628, the entire teachings of which are incorporated herein by reference, includes a source 1905, which typically provides a polarized output, a modulator 1910, which encodes data onto the optical signal, and the EDFA 1100, employing the principles of the present invention and providing a single-polarization output. Using the EDFA 1100, the 1550 nm optical signal remains polarized from the source 1905 through the EDFA 1100 and onto the network data path 1915 without the assistance of a polarizer.

As discussed above, using the EDFA 1100 provides only half of the noise as would be put onto the signal were it to have both polarizations (i.e., TE and TM modes). Therefore, although the fiber of the network data path 1915 tends not to maintain polarization, for signal-to-noise ratio reasons, there is some benefit to using the EDFA 1100 providing a single-polarization output. Again, since adding and amplifying noise is cumulative, providing multiple single-polarization EDFA's 1100 across the network 1800 (FIG. 18) controls the signal-to-noise ratio of signals, thereby reducing bit-rate errors between devices communicating across the network, such as from content provider servers 1805 to clients 1820 (FIG. 18).

Since light of both orthogonal polarizations pass through the erbium fiber, gain and, hence, the noise contribution is the same in both polarization states. In addition, by passing through each element twice, the effects of such elements are enhanced, as shown in FIG. 20 for a three cavity, thin film, transmission filter.

Figure 20:
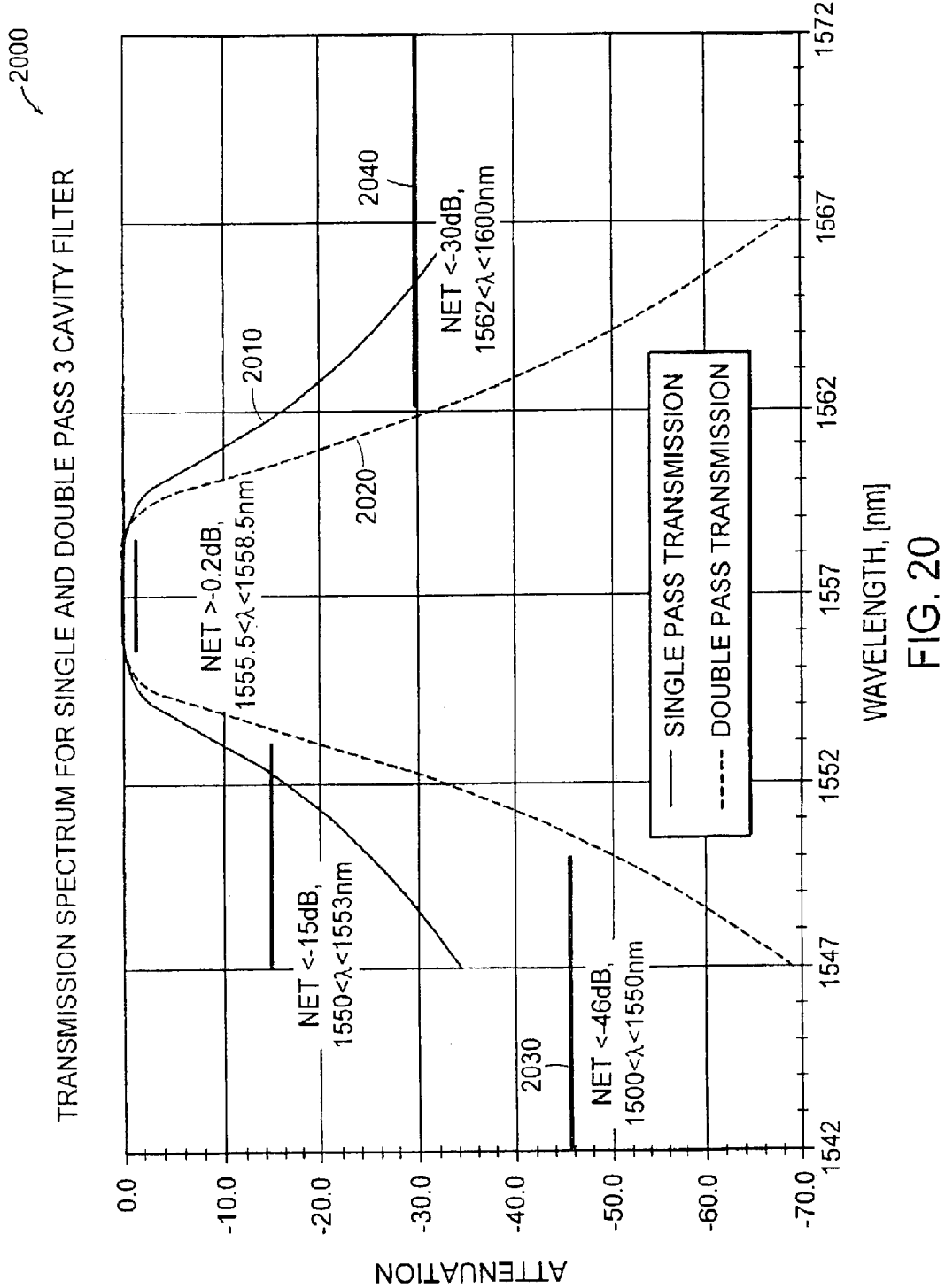
FIG. 20 is a plot of the transmission spectrum for a single and double pass three cavity filter.

Referring now to FIG. 20, the net transfer function for a single pass through the transmission filter is $T_{sp}(\lambda)$ 2010, and the net transfer function for the double pass is $T_{dp}(\lambda) = T^2_{sp}(\lambda)$ 2020. This makes it easier to produce narrow bandpass filters with very good rejection bands 2030, 2040, since a filter with x=15 dB attenuation in the single pass—which is relatively easy and inexpensive to fabricate—will produce 2x=30 dB attenuation for the double pass.

Double-pass filters generate waveforms that are more symmetric than single-pass filters. For example, pending U.S. patent application Ser. No. 09/261,628, filed on Mar. 3, 1999, entitled "Variable-Rate Communication System with Optimal Filtering," by Caplan et al., the entire teachings of which are incorporated herein, describes a Symmetric Filtering (SF) approach that can be used with quasi-symmetric waveforms that lead to improved communications performance. So, by inserting the double-pass filters into the loss-insensitive region 600 (FIG. 6), the benefits of the symmetric filtering approach can be taken advantage of with essentially no performance penalty.

Figure 21:
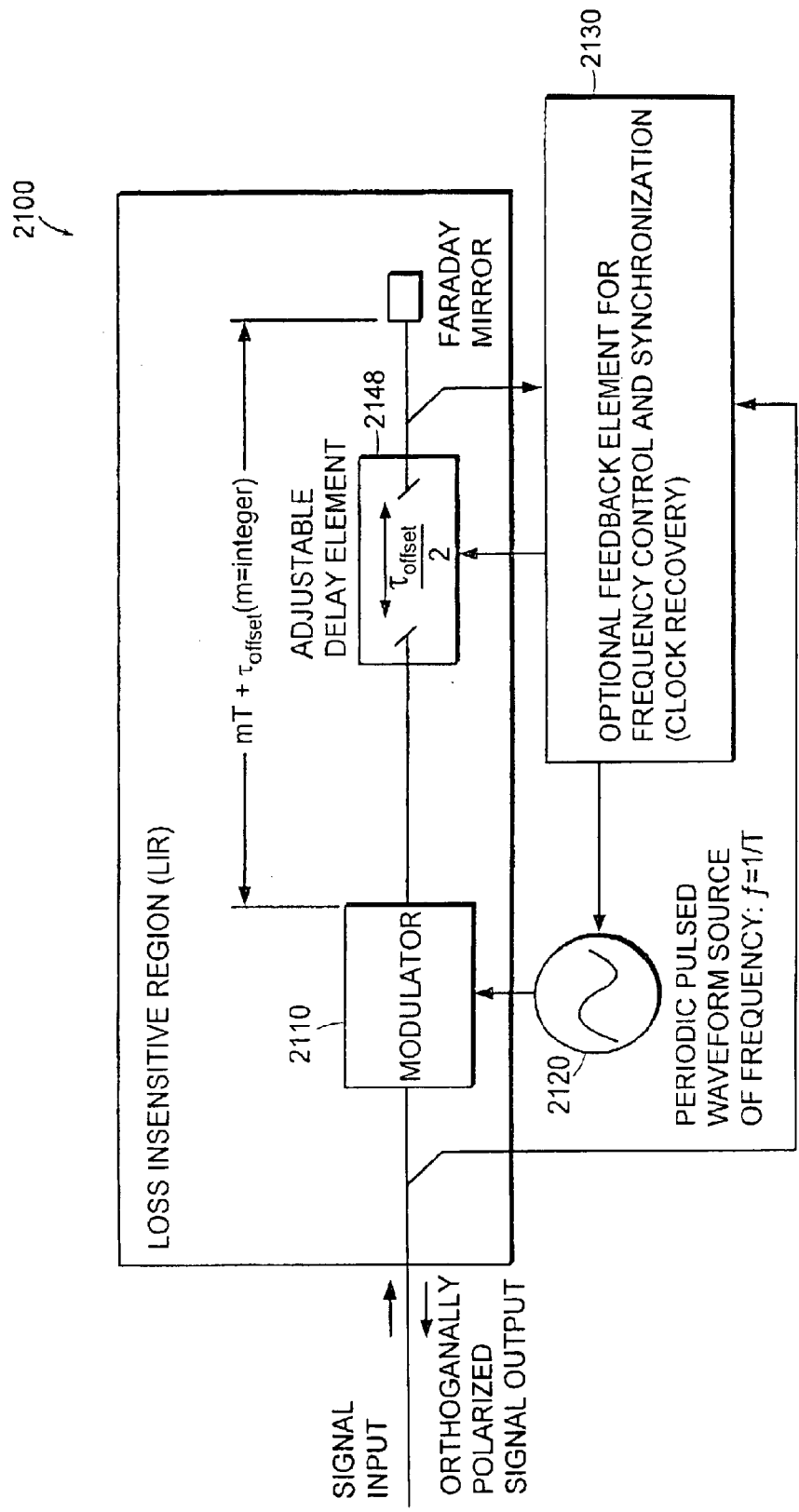
FIG. 21 is a block diagram of a pulse-shaping or pulse generating configuration.
Figure 22:
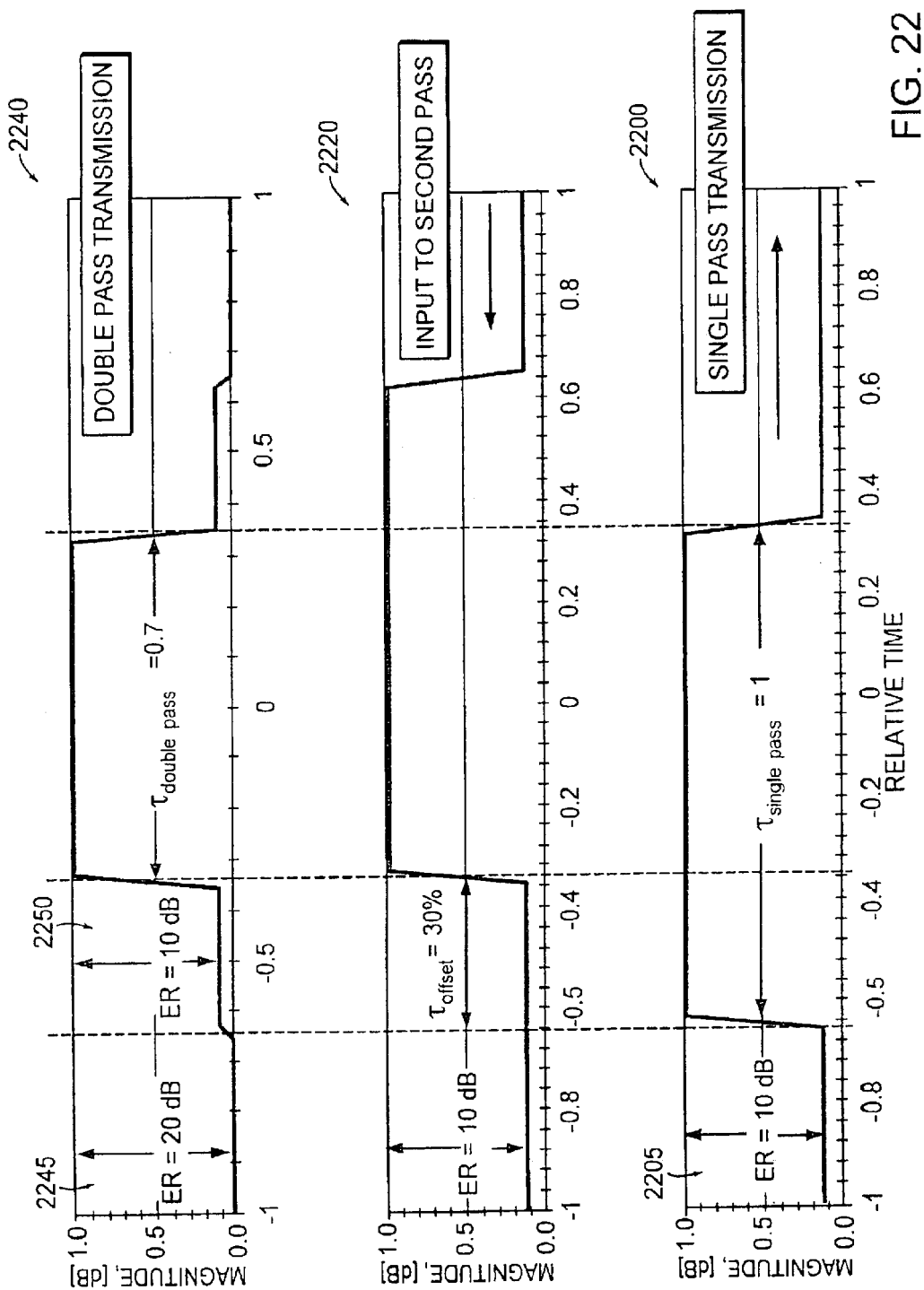
FIGS. 22–23 are plots of time-domain output waveforms from a pulse-shaping element in the loss-insensitive region.

There are also benefits for using direction-independent modulating devices, such as electro-absorptive modulators in the double-pass LIR. As shown in FIGS. 21–27, using such devices in the LIR (i) can improve the extinction ration (ER) and (ii) reduce or adjust the transmitted pulse width or shape when generating or shaping a return-to-zero (RZ) pulse stream. FIGS. 21 and 22 show that by varying a delay element in the LIR, the pulse width of the amplified output waveform can be adjusted to generate the waveforms shown in FIGS. 23–27.

FIG. 21 shows a pulse-shaping or pulse generating configuration 2100 that can be used in the LIR for applications such as improving extinction ratio, pulse shaping, generating variable pulse widths or peak power levels, or complete 3R (re-amplification, regeneration, and resynchronization). This setup can function in a single or double pass configuration if the modulator 2110 is direction dependent (e.g., a traveling wave Mach-Zehnder modulator) or direction independent (e.g., an electro-absorption modulator (EAM)).

In the direction independent case, the modulator 2110 can be driven by a periodic pulsed waveform 2120 with a frequency equal to 1/T, where T is the symbol period in the transmitted data stream. Phase and frequency can be controlled with an optional feedback or feedforward control element 2130. An adjustable delay element 2040, located after the modulator 2110, is used to control the round-trip delay to an integer multiple of the symbol period plus an offset ($\tau_{offset}/2$), such that the net round trip delay is $mT+\tau_{offset}$, where m is an integer. The adjustable delay element can also be controlled by feedback or feedforward control elements to achieve desired pulse width, shape, or timing. Furthermore, this active approach can be combined with a plurality of other filtering/shaping techniques to achieve a desired waveform.

FIG. 22 illustrates the effect of double-pass modulator pulse shaping for a fixed 30% offset and a 10 dB modulator extinction ratio (ER). A single-pass transmission 2200 with a 10 dB ER 2205 returns to the modulator with a 30% offset, as shown by a double-pass transmission input 2220. A double pass transmission output 2240 has a reduced pulse width and (i) an improved extinction 20 dB ER 2245 outside of the overlap and (ii) a 10 dB ER 2250 within the 30% offset.

Figure 23:
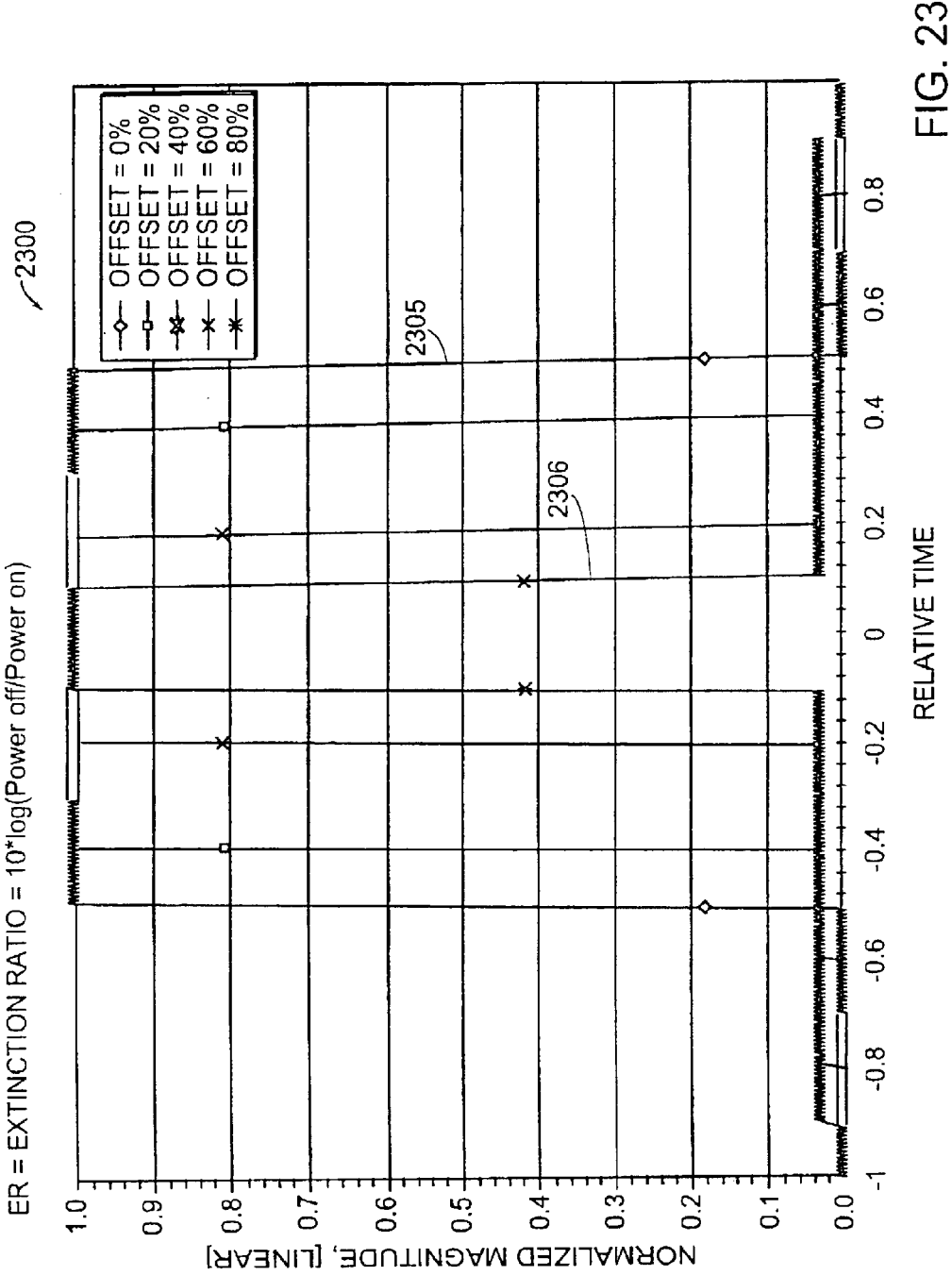

FIG. 23 illustrates the effect of double-pass modulator pulse shaping for varying offset delays and a 15 dB modulator extinction ratio. The 0% offset waveform 2305 has retained its basic single-pass shape and pulse width, but has an improved 30 dB ER. In contrast, the 80% offset waveform 2306 has a substantially reduced pulse width, but little improvement in ER.

Figure 24:
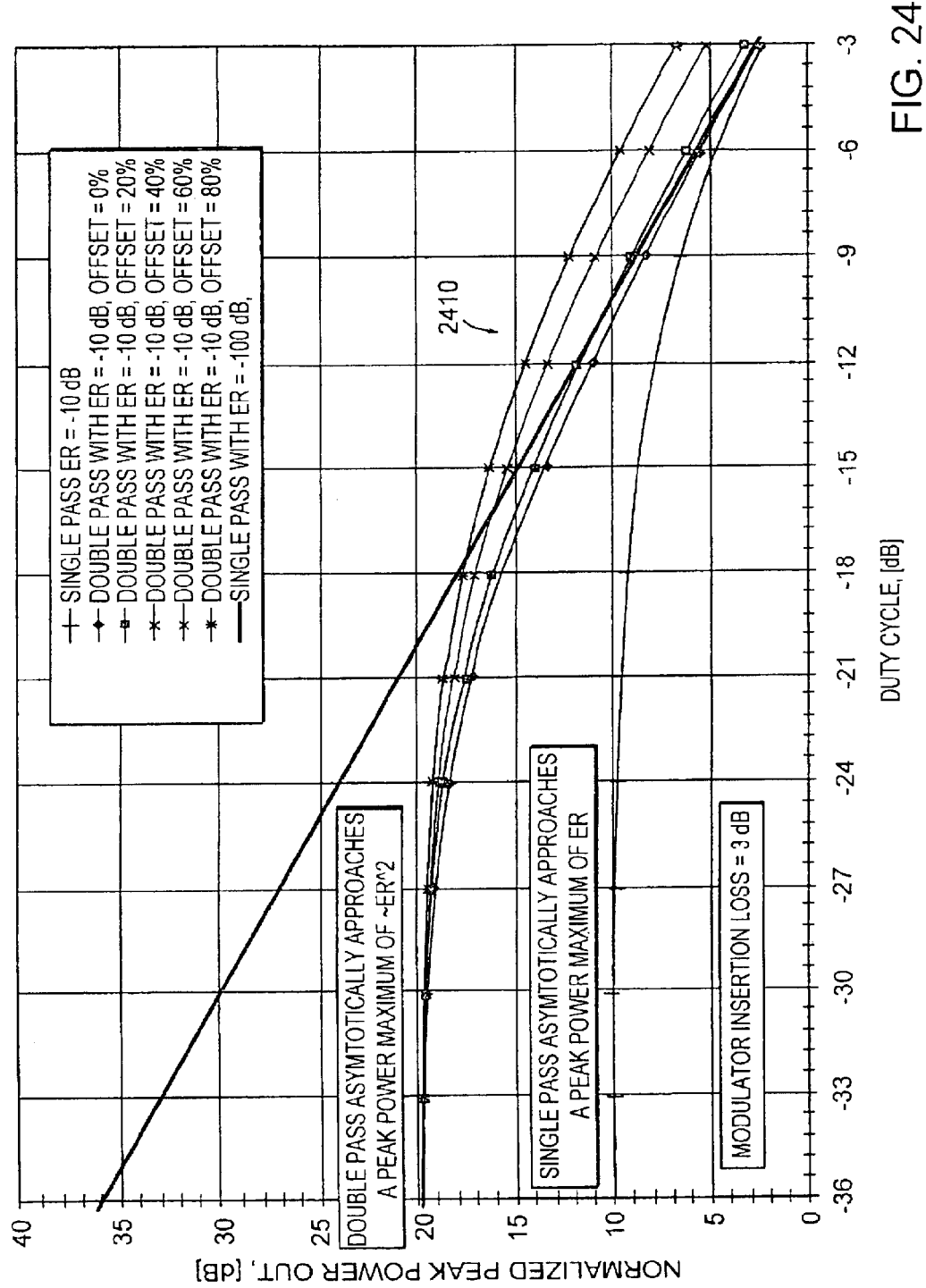
FIG. 24 is a graph of peak output power for double and single pass modulation within the loss-insensitive region, with varying delay offsets and modulation duty cycles.

FIG. 24 shows the calculated output peak power from the saturated (average power limited) amplifier for double- and single-pass modulation with varying offsets and duty-cycles. The expression for the peak double-pass power is given by:

$$P_{peak, double\ pass} = \frac{P_{average}[\text{LIR\_IL}(\tau_{offset})]}{DC*(1-\tau_{offset}+2*\tau_{offset}*ER)+(1-DC*\tau_{offset})*ER^2}$$

and the expression for the peak single-pass power is given by:

$$P_{peak, single\ pass} = \frac{P_{average}[\text{LIR\_IL}(\tau_{offset})]}{DC+(1-DC)*ER}$$

where LIR_IL is the insertion loss within the loss-insensitive region, which is a function of $\tau_{offset}$, and $P_{average}$ is the average saturated output power, which is a weak function of LIR_IL, shown in FIG. 7B. For a modulator with a 3 dB single-pass insertion loss and a 10 dB ER, normalized peak output power asymptotically approaches 10 dB (~ER) for the single-pass case, whereas it approaches 20 dB (~$ER^2$) for the double-pass case. Moreover, the double-pass configuration can produce higher peak power levels 2410 by varying the offset time delay.

Figure 25:
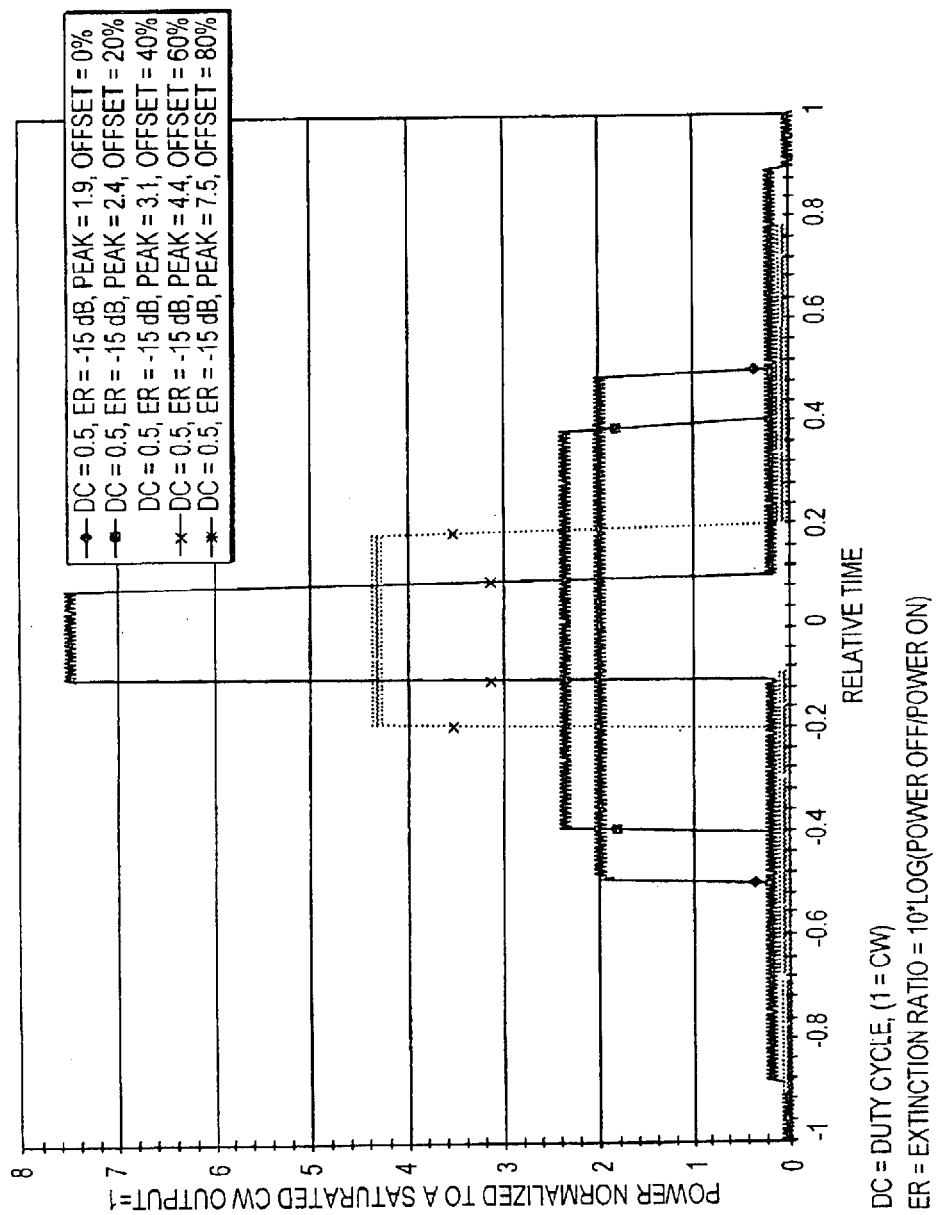
FIGS. 25–27 are plots of time-domain output waveforms from a saturated optical amplifier with a pulse-shaping element within the loss-insensitive region and varying offset delays.
Figure 26:
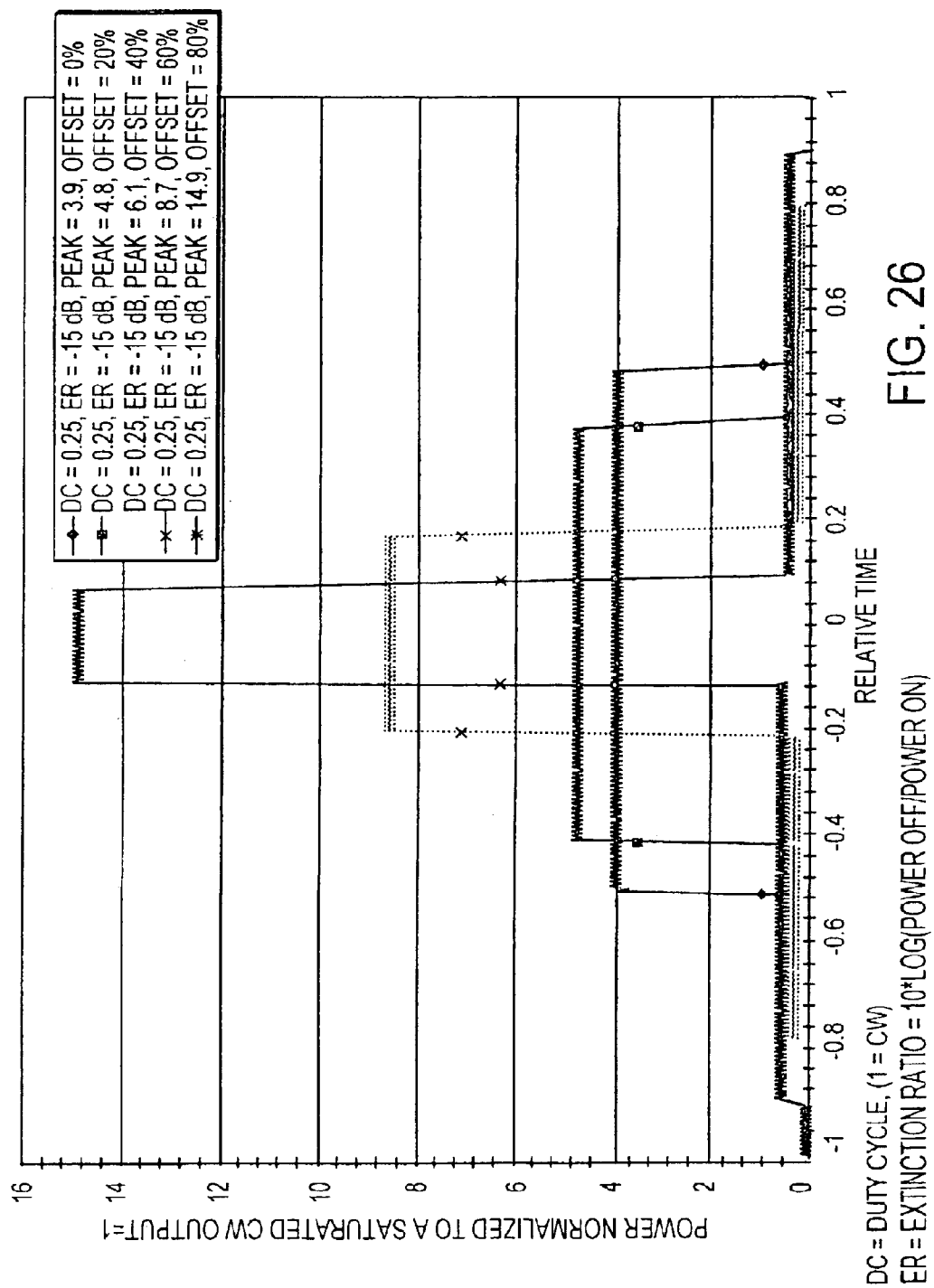
Figure 27:
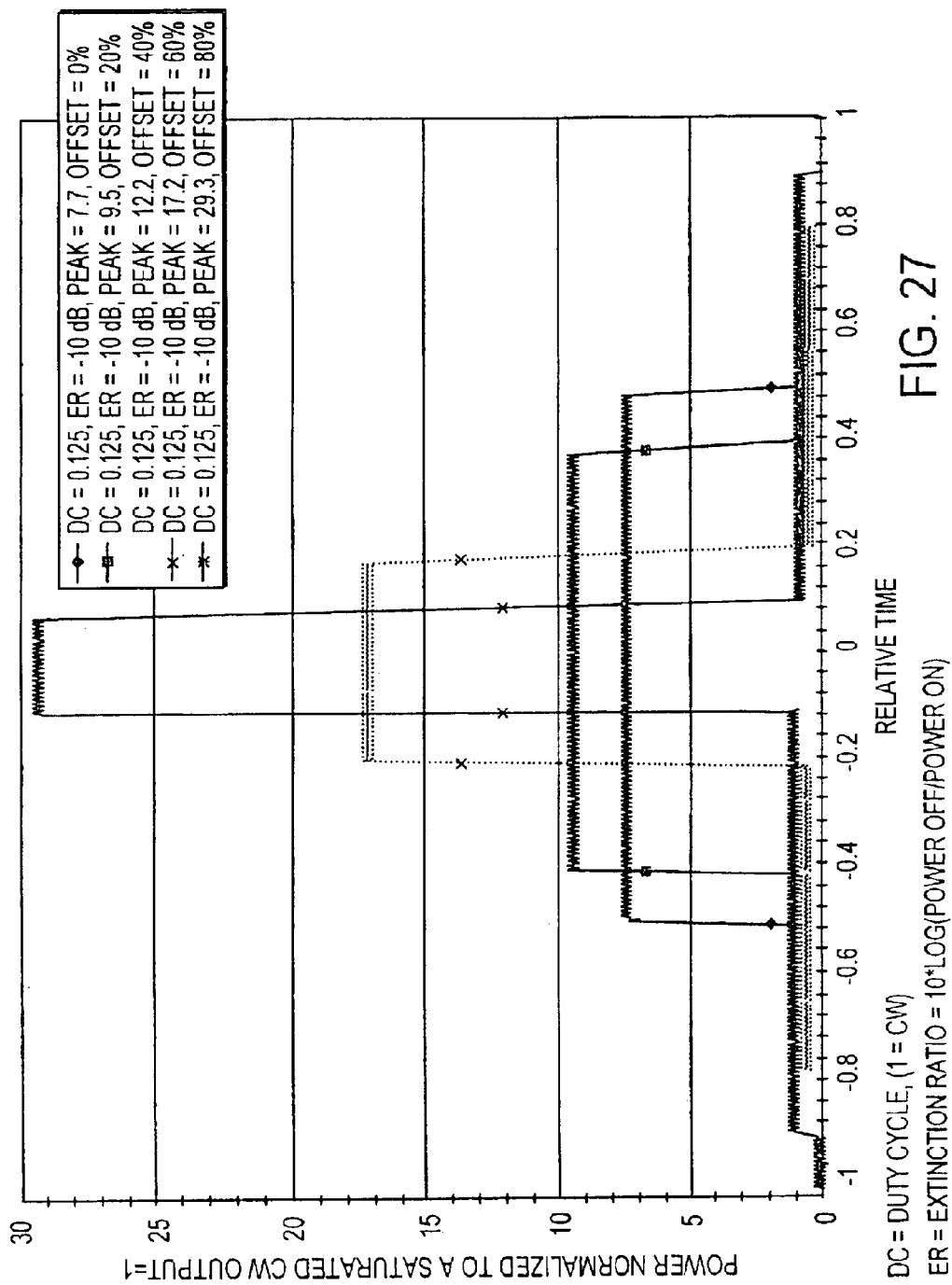

FIG. 25 shows the saturated amplifier output waveforms for adjustable pulse width and peak output power for a duty-cycle DC=½, ER=−15 dB, and varying offset delays normalized to a percentage of maximum pulse width. FIGS. 26 and 27 show the same, but for DC=¼ and ⅛, respectively, with peak power levels reaching as high as 29 times the average. Note that, while approximately square waveforms were shown here for the purposes of illustration, other pulse shaping waveforms (such as approximately Gaussian or hyperbolic secant pulses) can be applied in a similar manner.

Such capabilities can be used to actively optimize overall system performance. For instance, if intersymbol interference (ISI) were a limiting factor at the end of a communication link, the pulses can potentially be narrowed at upstream amplifier/regeneration node or nodes; whereas, if nonlinear effects dominate, the pulses, for example, could possibly be broadened in time to reduce peak power levels, (as shown in FIGS. 24–27), since the optical amplifier of this invention is predominantly average power limited (APL). Consequently, a high-gain EDFA directly expands the functional range of transmission rates for variable duty-cycle, multi-rate, optical communication systems, as discussed in Caplan et al., "High-sensitivity variable-rate transmit/receive architecture", IEEE Leos '99, TuU 0003, 1999 and pending U.S. patent application Ser. No. 09/261,628, filed on Mar. 3, 1999, the entire teachings of both are incorporated herein by reference.

Direction dependent intensity and phase modulators, such as traveling wave devices, can be used to modify the waveform, as well. Despite making two passes through such a device, only one pass sees the effect of such a modulator. Consequently, these devices can be incorporated into the LIR to reshape, retime, and so forth without constraints on the round trip time delay from the back-reflecting element. While there is no benefit of enhanced double-pass ER, periodic or non-periodic waveforms can be used to shape the transmitted signals or directly impart data on the transmitted signal.

In addition, specialty fibers (such as DCF, DSF, etc.) are typically expensive compared to standard telecom fibers. Since the effect of these fibers (and cost) are a function of their length, significant savings (in both cost and packaging/handling expense) can be realized by incorporating them in the loss-insensitive double pass design, which can achieve a desired goal with essentially half the fiber with little or no impact on the amplifier output power.

In summary, the double-pass benefits for using pulse or spectral shaping elements in the loss-insensitive region include:

1. elimination of polarization dependent loss (PDL) sensitivity;
2. enhancement of transfer functions providing better rejection or extinction ratio with less expensive, easier to manufacture elements;
3. provision of capability for adjustable pulse shaping, variable pulse widths, and peak power levels;
4. useful as a pulse shaper or generator in single or double-pass configurations, depending on the direction dependence of the modulator;
5. generation of more symmetric waveforms in time, so can be used for symmetric filtering (SF); and
6. allowance for less specialty fiber needed for dispersion compensation or nonlinear switching.

While this invention has been particularly shown and described with references to preferred embodiments thereof, it will be understood by those skilled in the art that various changes in form and details may be made therein without departing from the scope of the invention encompassed by the appended claims.

It should be understood that although the preferred embodiment of the EDFA (e.g., EDFA 1100) provides a single-polarization output, the principles of the present invention also support an optical amplifier embodiment having a non-polarized output. One such way to provide the EDFA without a polarized output is to use a non-polarizing beam splitter or a circulator, which allows a signal to enter the EDFA in the forward pass and the amplified signal to exit the EDFA from the reverse pass without being polarized by an optical element of the EDFA.

Although shown as a band-pass filter, the optical element in the loss-insensitive region may be, or include, at least one of the following filters: band-reject filters, notch filters, comb filters or other pulse shaping elements than can be used in optical networks. The band-reject filter and/or notch filter are employed to reduce the ASE, as indicated in FIGS. 10A and 10B. The comb filter is typically employed for wavelength division multiplexing systems, which service multiple data signals at multiple wavelengths in a multiplexing manner. Such a filter can pass (or shape) multiple signal wavelengths while attenuating out-of-band ASE noise.

Pulse shaping elements are typically employed to compensate for effects such as fiber dispersion, nonlinearities, or accumulated noise, but could also be used to generate a particular waveform that improves net communication performance in the presence of one or more such effects. Such an element or elements could be a specialized transmission filter, or a type of fiber such as dispersion compensating fiber (DCF), dispersion shifted fiber (DSF), small core fiber which can increase nonlinear effects, or a combination of such elements. Also, pulse shaping elements, such as saturable absorbers, modulators, and nonlinear optical switches, which directly modify the waveform in time, can be added for applications including all-optical re-amplification, regeneration, and retiming (3R) signal processing in place of costly optical-to-electronic-optical (OEO) conversion.

All optical wavelength converters can also be employed in the loss-insensitive region (LIR). Such elements can be used to route optical signals, shift wavelength(s) in cases of conflict within an optical network, and perform spectral inversion, which can be used to combat the effects of fiber dispersion and nonlinearities. Although current wavelength converters presently have poor conversion efficiency of about −7 dB, they can be used within the LIR with less than 0.5 dB power penalty at the amplifier output, according to the simulations of FIG. 7B. And, since the signal makes a double pass (in orthogonal polarizations) through elements in the loss-insensitive region of the optical amplifier of this invention, power variation due to polarization dependent loss (PDL) of these elements is eliminated. This benefit extends outside of the LIR, as well, eliminating effects such as polarization hole burning in the erbium fiber.

Also, the preferred embodiments generally describe single-mode erbium-doped fiber as the gain medium pumped by single-mode pumps that are coupled, using single-mode coupling elements, to the erbium fiber. It should be understood that the scope of the present invention does not restrict the gain medium to being single-mode erbium-doped fiber. The principles of the present invention work with multimode gain media and cladding pumped designs, in which case, the wavelength(s) or type of the pump(s) (single or multi-mode) may be selected to be an alternative wavelength to provide maximum energy transfer to the alternative gain medium.

Also, the length of the gain medium described herein is generally about 15 m to about 17 m, which is nearly optimum for two 500 mW, 980 nm wavelength multiplexed QPM's (quad pump modes) pumping Lucent® HP980 type erbium fiber. However, the length of the fiber may be optimized for the 980 nm pump wavelength(s) or the 1480 nm pump wavelength(s), as well as pump and signal power levels, type of gain medium, or pumping configuration. Additionally, the gain medium may be selected to have a length suitable for another wavelength should a third pump wavelength be selected or should different doping concentrations or materials be implanted in the same or different gain medium. It should be understood that the principles of the present invention extend to optical amplifiers beyond the EDFA embodiment described herein.

What is claimed is:

1. An optical amplifier, comprising:
    an amplifying optical path of elements of low insertion losses including a non-lasing optical gain medium through which an optical signal is amplified;
    an optical return path by which amplified light from a first pass returns through the gain medium in a reverse pass through the gain medium; and
    at least one optical element in the optical return path between the forward pass and the reverse pass having a loss substantially greater than the insertion losses of the elements of the amplifying optical path;
    the optical amplifier operating in saturation and being substantially non-lasing.

2. The optical amplifier according to claim 1, wherein the elements in the amplifying optical path have insertion losses less than about 0.5 dB.

3. The optical amplifier according to claim 2, wherein the elements in the amplifying optical path have insertion losses less than about 0.2 dB.

4. The optical amplifier according to claim 1, wherein said at least one optical element between the forward pass and the reverse pass has a loss of greater than 0.5 dB.

5. The optical amplifier according to claim 1, further including an input element coupling the optical signal to the amplifying optical path of elements, wherein the input element is selected from a group consisting of: a beam splitter, polarizing beam splitter, or circulator.

6. The optical amplifier according to claim 1, wherein the gain medium includes an erbium-doped fiber.

7. The optical filter according to claim 1, further including at least one energy pump coupled to the gain medium.

8. The optical amplifier according to claim 7, wherein said at least one energy pump includes an energy pump outputting a signal of about 980 nm wavelength.

9. The optical amplifier according to claim 7, wherein said at least one energy pump includes an energy pump outputting a signal of about 1480 nm wavelength.

10. The optical amplifier according to claim 7, further including multiple spare energy pumps.

11. The optical amplifier according to claim 1, wherein the gain medium is about 15 meters in length.

12. The optical amplifier according to claim 1, wherein said at least one optical element between the forward pass and the reverse pass includes at least one of the following filters: band pass filter, band reject filter, notch filter, or comb filter.

13. The optical amplifier according to claim 1, wherein said at least one optical element between the forward pass and the reverse pass includes at least one of the following optical elements: pulse shaper, specialty fiber, nonlinear optical element, dispersion compensating element, direction independent modulator, direction dependent modulator, optical delay element, optical switch, wavelength converter, pump coupling element or wavelength division multiplexer coupling at least one energy pump outputting a signal of about 1480 nm wavelength or 980 nm wavelength to a gain medium in the optical return path.

14. The optical apparatus according to claim 1, wherein said at least one optical element includes an optical return element selected from a group consisting essentially of: a mirror, Faraday mirror, polarization rotation reflection element, beam splitter and plural mirrors, or continuous optical medium loop.

15. The optical amplifier according to claim 1, wherein the round-trip gain of the optical signal does not equal the round-trip loss of the optical signal.

16. The optical amplifier according to claim 1, wherein:
    the amplifying optical path of elements includes:
        a first WDM, coupled to the non-lasing optical gain medium, inserting into the non-lasing optical gain medium a signal of about 980 nm wavelength from a first energy pump;
        a second WDM, coupled to a second non-lasing optical gain medium, inserting a into the second non-lasing optical gain medium a signal of about 980 nm wavelength from a second energy pump;

said at least one optical element, having a loss substantially greater than the insertion losses of the amplifying optical path, passes essentially the optical signal and includes a Faraday mirror; and said at least one optical element further including a third WDM, optically disposed between the forward pass and the reverse pass, inserting into the second and first optical gain media energy of about 1480 nm wavelength from a third energy pump.

17. The optical amplifier according to claim 1, wherein the optical signal, having been amplified, is substantially singularly polarized.

18. The optical amplifier according to claim 17, wherein the polarization state of the optical signal, having been amplified, is independent of the polarization state of the input.

19. The optical amplifier according to claim 1, wherein the optical element in the optical return path between the forward pass and the reverse pass restricts the optical signal to wavelengths of interest to prevent other wavelengths from lasing.

20. The optical amplifier according to claim 1, used in a free-space application.

21. The optical amplifier according to claim 1, used in a fiber network application.

22. The optical amplifier according to claim 1 wherein the amplified optical signal exiting the reverse path is at least about 200 mW.

23. The optical amplifier according to claim 1 having an efficiency of at least about 15%.

24. A method for amplifying an optical signal, comprising:

amplifying, through a non-lasing optical gain medium, the optical signal through an amplifying optical path of elements of low insertion losses including the non-lasing optical gain medium;

redirecting the amplified optical signal from a first pass through the gain medium to a reverse pass through the gain medium;

engaging the amplified optical signal with at least one optical element, between the forward pass and the reverse pass, having a loss substantially greater than the insertion losses of the amplifying optical path; and the amplifying occurring in saturation and being substantially non-lasing.

25. The method according to claim 24, wherein the elements in the amplifying optical path have insertion losses less than about 0.5 dB.

26. The method according to claim 25, wherein the elements in the amplifying optical path have insertion losses less than about 0.2 dB.

27. The method according to claim 24, wherein said at least one optical element between the forward pass and the reverse pass has a loss of greater than 0.5 dB.

28. The method according to claim 24, further including directing the optical signal to the amplifying optical path of elements via an input element, wherein the input element is selected from a group consisting of: a beam splitter, polarizing beam splitter, or circulator.

29. The method according to claim 24, wherein the gain medium includes an erbium-doped fiber.

30. The method according to claim 24, further including coupling at least one energy pump to the gain medium.

31. The method according to claim 30, wherein said at least one energy pump includes an energy pump outputting a signal of about 980 nm wavelength.

32. The method according to claim 30, wherein said at least one energy pump includes an energy pump outputting a signal of about 1480 nm wavelength.

33. The method according to claim 30, further including multiple spare energy pumps.

34. The method according to claim 24, wherein the gain medium is about 15 meters in length.

35. The method according to claim 24, wherein said at least one optical element between the forward pass and the reverse pass includes at least one of the following filters: band pass filter, band reject filter, notch filter, or comb filter.

36. The method according to claim 24, wherein said at least one optical element between the forward pass and reverse pass includes at least one of the following optical elements: pulse shaper, specialty fiber, nonlinear optical element, dispersion compensating element, direction independent modulator, direction dependent modulator, optical delay element, optical switch, wavelength converter, pump coupling element or wavelength division multiplexer coupling at least one energy pump outputting a signal of about 1480 nm wavelength or 980 nm wavelength to a gain medium in the optical return path.

37. The method according to claim 24, wherein said at least one optical element includes an optical return element selected from a group consisting essentially of: a mirror, Faraday mirror, polarization rotation reflection element, beam splitter and plural mirrors, or continuous optical medium loop.

38. The method according to claim 24, wherein the round-trip gain of the optical signal does not equal the round-trip loss of the optical signal.

39. The method according to claim 24, further including:

inserting into the non-lasing optical gain medium a signal of about 980 nm wavelength from a first energy pump;

inserting a into a second non-lasing optical gain medium a signal of about 980 nm wavelength from a second energy pump;

passing essentially only the frequency of the optical signal;

inserting a signal of about 1480 nm wavelength from a third energy pump, optically disposed between the forward pass and the reverse pass, into the second and first optical gain media.

40. The method according to claim 24, wherein the optical signal, having been amplified, is substantially singularly polarized.

41. The method according to claim 24, wherein the polarization state of the optical signal, having been amplified, is independent of the polarization state of the input signal.

42. The method according to claim 24, wherein engaging the amplified optical signal with at least one optical element between the forward pass and the reverse pass includes restricting the amplified optical signal to wavelengths of interest to prevent other wavelengths from lasing.

43. The method according to claim 24, used in a free-space application.

44. The method according to claim 24, used in a fiber network application.

45. The method according to claim 24 wherein the amplified optical signal exiting the reverse path through the gain medium is at least about 200 mW.

46. The method according to claim 24 wherein amplifying the optical signal is at least about 15% efficient.

47. An optical amplifier, comprising:

an input/output element (i) receiving an optical signal and directing the optical signal in a forward path composed of a gain medium having a low insertion loss, and (ii) receiving the amplified optical signal and directing the amplified optical signal away from the gain medium;

an energy pump adding energy to the gain medium along the fiber, the optical signal being amplified by interacting with the added energy;

a reversal element directing the amplified signal in a reverse path in the optical fiber for a second amplification by interacting with the added energy; and an optical element in addition to the optical fiber and having a loss substantially greater than the insertion losses of the elements of the forward and reverse paths, the optical element stabilizing the optical signal to achieve saturation (i) for a greater range of given input power levels of the optical signal than without the optical element and (ii) without significantly reducing the overall output power of the optical amplifier;

the optical amplifier operating in saturation and being substantially non-lasing.

48. The optical amplifier according to claim 47 wherein the amplified signal exiting the reverse path is at least about 200 mW.

49. The optical amplifier according to claim 47 having and efficiency of at least about 15%.

50. An optical amplifier, comprising:
a high-gain high-power optical assembly comprising:
a first optical director element directing an optical signal in a forward direction in an optical transmission medium having low insertion loss, the optical transmission medium comprising energy absorbing matter, at least one optical pump coupled to the optical transmission medium to increase an energy state of at least a portion of the optical transmission medium; and a second optical director element redirecting the optical signal in a reverse direction in the optical transmission medium back to the first optical director element to be directed by the first optical director element in an outward direction from the optical medium, the optical signal being amplified in both the forward and reverse directions by the increased energy state of the portion of the optical medium, the optical signal at an output of the optical medium having a power level corresponding to a saturation range for the optical amplifier, the saturation range being achieved for a given power range of the optical signal received by the first optical director element; and a stability extender optically disposed between the optical transmission medium and the second optical director element and having a loss substantially greater than insertion losses of the optical transmission medium, the stability extender reducing amplified spontaneous emission at wavelengths other than about the wavelength of the optical signal to extend the range of power of the optical signal at which the amplifier output is saturated;

the optical amplifier operating in saturation and being substantially non-lasing.

51. A method for extending stability of a high-gain, high-power optical amplifier, the method comprising:
directing an optical signal into an optical transmission medium, having low insertion loss, in a forward direction;

redirecting the optical signal back through the optical transmission medium in a reverse direction;

amplifying the optical signal in the optical transmission medium in each direction such that the twice-amplified optical signal achieves saturation for a given range of power levels of the unamplified optical signal;

between directing and redirecting, filtering the optical signal, through use of an optical element having a loss substantially greater than insertion loss of optical transmission medium, to extend the given range of power levels of the optical signal for which the twice-amplified optical signal achieves saturation; and outputting the twice-amplified optical signal from the optical transmission medium;

the amplifying occurring in saturation and being substantially non-lasing.

52. An apparatus for optically amplifying an optical signal, comprising:
means for directing an optical signal into an optical transmission medium, having low insertion loss, in a forward direction;

means for redirecting the optical signal back through the optical transmission medium in a reverse direction;

means for amplifying the optical signal in the optical transmission medium in each direction such that the twice-amplified optical signal achieves saturation for a given range of power levels of the unamplified optical signal;

between said means for directing and said means for redirecting, means, having a loss substantially greater than insertion losses of the directing means and optical transmission medium, for filtering the optical signal to extend the range of power levels of the optical signal for which the twice-amplified optical signal achieves saturation; and means for outputting the twice-amplified optical signal from the optical transmission medium;

the apparatus operating in saturation and being substantially non-lasing.

* * * * *